US008818873B1

(12) United States Patent     (10) Patent No.: US 8,818,873 B1
Kim et al.     (45) Date of Patent: Aug. 26, 2014

(54) METHOD OF OPERATING A DUTY-FREE STORE AT AN AIRPORT WITH A PRODUCT STORAGE AREA AND PRODUCT PICKUP AREA

(71) Applicants: Jong Myoung Kim, Yorba Linda, CA (US); David Yunsoo Kim, Yorba Linda, CA (US)

(72) Inventors: Jong Myoung Kim, Yorba Linda, CA (US); David Yunsoo Kim, Yorba Linda, CA (US)

( * ) Notice: Subject to any disclaimer, the term of this patent is extended or adjusted under 35 U.S.C. 154(b) by 0 days.

(21) Appl. No.: 13/775,043

(22) Filed: Feb. 22, 2013

(51) Int. Cl.
*G06Q 20/00* (2012.01)
*G06Q 20/20* (2012.01)
*G07G 1/12* (2006.01)

(52) U.S. Cl.
CPC .............. *G06Q 20/204* (2013.01); *G06Q 20/20* (2013.01); *G07G 1/12* (2013.01)
USPC ............................................... 705/17; 705/16

(58) Field of Classification Search
CPC .............................. G06Q 20/20; G06Q 20/204
USPC .......................................................... 705/17, 16
See application file for complete search history.

(56) References Cited

U.S. PATENT DOCUMENTS

| 7,853,477 | B2 | 12/2010 | O'Shea et al. |
| 2001/0049636 | A1 | 12/2001 | Hudda et al. |
| 2006/0235757 | A1 | 10/2006 | Issler |
| 2009/0084840 | A1* | 4/2009 | Williams et al. ............... 235/379 |
| 2010/0082455 | A1 | 4/2010 | Rosenblatt et al. |
| 2011/0125611 | A1 | 5/2011 | Perron et al. |
| 2011/0137715 | A1 | 6/2011 | O'Shea et al. |
| 2011/0153398 | A1* | 6/2011 | Tjhai et al. .................. 705/14.14 |
| 2011/0276385 | A1 | 11/2011 | Keller |
| 2012/0005023 | A1 | 1/2012 | Graff |
| 2012/0138679 | A1* | 6/2012 | Doyle ............................ 235/380 |
| 2012/0190386 | A1 | 7/2012 | Anderson |

OTHER PUBLICATIONS

International Search Report and Written Opinion issued in PCT Application No. PCT/US2013/037634, mailed Jul. 29, 2013, in 13 pages.
Product showcase, Anonymous. Supply Chain Europe. Leatherhead: May/Jun. 2010. vol. 19, Iss. 3; p. 48, downloaded from ProQuestDirect on the Internet on Jul. 30, 2012, 6 pages.
Barr, "Shopping on the run; Retailers adapt as more consumers shop with smartphones in hand", National Post. Don Mills, Ont.: Nov. 21, 2011, downloaded from ProQuestDirect on the Internet on Jul. 30, 2012, 4 pages.

(Continued)

*Primary Examiner* — Seye Iwarere
(74) *Attorney, Agent, or Firm* — Knobbe Martens Olson & Bear LLP

(57) ABSTRACT

The disclosure provides a method of operating a duty-free retail operation at an airport. The airport includes a secure zone and a non-secure zone, which are separated for passengers by a security checkpoint. The duty-free store may be located in the non-secure zone of the airport. The airport may also include a product storage area and a product pickup area, which can be accessible from the duty-free store or remote from the duty-free store. The product storage area may store copies of the products displayed in the duty-free store. A passenger customer can purchase products displayed in the duty-free store, for example, by scanning QR codes associated with products and making a payment using a mobile computing device. Copies of purchased products may then be retrieved from the product storage area and delivered to a designated product pickup area before the customer boards the plane.

30 Claims, 13 Drawing Sheets

(56) References Cited

OTHER PUBLICATIONS

Burke, "Technology and the customer interface: What Consumers Want in the Physical and Virtual Store", Academy of Marketing Science. Journal; Fall 2002; 30, 4; ABI/Inform Global, p. 411, downloaded from ProQuestDirect on the Internet on Jul. 30, 2012, 22 pages.

Thiesse, et al., Understanding the value of integrated RFID systems: a case study from apparel retail, Thiesse, Frederic; Al-kassab, Jasser; Fleisch, Elgar, European Journal of Information Systems, Special Section on Managing RFID Projects in 18. 6 (Dec. 2009): 592-614, downloaded from ProQuestDirect on the Internet on Dec. 5, 2012, 16 pages.

* cited by examiner

METHOD OF OPERATING A DUTY-FREE STORE AT AN AIRPORT WITH A PRODUCT STORAGE AREA AND PRODUCT PICKUP AREA

CROSS-REFERENCE TO RELATED PATENT APPLICATIONS

This application is related to U.S. application Ser. No. 13/454,962, filed on Apr. 24, 2012, entitled "METHOD OF OPERATING RETAIL STORE WITH MOBILE APPLICATION FOR SEARCHING PRODUCTS AVAILABLE BUT NOT DISPLAYED IN THE STORE," and U.S. application Ser. No. 13/454,971, filed on Apr. 24, 2012, entitled "METHOD OF OPERATING RETAIL STORE WITH MOBILE APPLICATION FOR SEARCHING PRODUCTS AVAILABLE FOR SALE IN THE RETAIL STORE," the entire contents of which are incorporated herein by reference.

BACKGROUND

1. Field

The present disclosure relates to operating retail stores and, in particular, to operating a duty-free store.

2. Description of Related Technology

Duty-free stores exist at airport terminal buildings, such as international terminals. However, the rent for such stores is expensive. In addition, automating purchase transactions in duty-free stores may be helpful to passengers, especially for passengers with limited time to shop duty-free items.

SUMMARY

The development and success of online shopping is at least partially due to the fact that online retailers are able to provide customers the option to easily browse through and select products from a much larger inventory compared to traditional retailers. This is made possible because online retailers do not face the same space restrictions that traditional retailers do. On the other hand, traditional retailers do have an advantage over online retailers in that traditional retailers provide customers with the option to physically observe and examine a product before purchasing.

One aspect of the invention provides a method of running a duty-free retail operation at an airport with all or part of the foregoing features and additional features defined below. The airport may comprise a secure zone and a non-secure zone, which are separated for passengers by a security checkpoint. The method may comprise: providing a duty-free store in the non-secure zone; displaying products for sale in the duty-free store, the products for sale comprising a first product and a second product; displaying unique product identification codes in connection with products displayed therein, the unique product identification codes comprising a first unique identification code associated with the first product and a second unique identification code associated with the second product; providing a product pickup area in the secure zone; and providing a product storage area remote from the duty-free store and configured to store copies of the products displayed in the duty-free store, the product storage area being inaccessible to customers.

The foregoing method may further comprise: receiving, by a computing system associated with the duty-free store, a first request for initiating a purchase transaction, the first request being created and sent from a mobile computing device of a first customer in relation to the first customer's capturing of the first unique identification code using the mobile computing device, the first request comprising first product information indicative of the first product; in response to the first request, creating a first database entry associated with the first request, the first database entry comprising the first product information; and in response to the first request, sending to the mobile computing device transaction information associated with the first database entry for use in initiating a payment transaction for a sale of the first product.

The foregoing method may further comprise: performing a payment transaction for the sale of the first product using the transaction information and referring to the first database entry; upon completion of the payment transaction, providing the first customer with pickup information for picking up a copy of the first product within the secure zone; subsequent to completion of the payment transaction, initiating retrieval of a copy of the first product from the product storage area for delivery of the copy to the product pickup area; and delivering the copy of the first product to the first customer at the product pickup area.

In the foregoing method, the transaction information may comprise a unique identifier associated with the first database entry, wherein the unique identifier is either the same as or different from the first unique identification code. The method may further comprise adding mobile device information indicative of the mobile computing device of the first customer to the first database entry so that the unique identifier is to identify the mobile computing device of the first customer. The first request may comprise a number of copies of the first product that the first customer desires to purchase, and the method may further comprise adding number information indicative of the number of copies of the first product to the first database entry so that the unique identifier is to further identify the number of copies of the first product. The method may also further comprise inputting the unique identifier at a point of sale location of the duty-free store, which initiates a payment transaction of the first product at the point of sale location. In the foregoing method, the unique identifier may comprise a QR code, and the method may further comprise scanning the QR code at a point of sale location of the duty-free store, wherein scanning of the QR code initiates a payment transaction of the first product at the point of sale location.

In the foregoing method, the first request for initiating a purchase transaction is created further in relation to the first customer's capturing of the second unique identification code using the mobile computing device, the first request further comprising second product information indicative of the second product. The first request for initiating a purchase transaction may be created using the captured first and second unique identification codes and further based on the first customer's confirmation of a desired number of copies of each of the first and second products.

The foregoing method may further comprise: receiving, by the computing system, a second request for initiating a purchase transaction, the second request being created and sent from the mobile computing device of the first customer in relation to the first customer's capturing of the second unique identification code using the mobile computing device, the second request comprising second product information indicative of the second product; and in response to the second request, creating a second database entry associated with the second request, the second database entry comprising the second product information; and in response to the second request, further sending to the mobile computing device transaction information for use in initiating a payment transaction for a sale of the second product.

The foregoing method may further comprise: receiving, by the computing system, a second request for initiating a purchase transaction, the second request being created and sent from the mobile computing device of the first customer in relation to the first customer's capturing of the second unique identification code using the mobile computing device, the second request comprising second product information indicative of the second product; and in response to the second request, adding the second product information to the first database entry.

In the foregoing method, the transaction information may comprise a web page for electronic payment transaction, wherein performing the payment transaction is conducted on the mobile computing device using the web page. In the foregoing method, sending the transaction information may comprise installing an applet on the mobile computing device, wherein the applet comprises an electronic payment transaction interface, wherein performing the payment transaction is conducted on the mobile computing device using the applet. In the foregoing method, the first unique identification code may comprise a QR code, wherein the customer's capturing of the first unique identification code comprises scanning the QR code using the mobile computing device of the customer. In the foregoing method, the pickup information may comprise a location of the product pickup area or may comprise an estimated time for pickup at the product pickup area.

The foregoing method may further comprise may provide the customer with at least one selected from the group consisting of: information that retrieval of a copy of the first product has been initiated from the product storage area; information that a copy of the first product has been retrieved within the product storage area; and information that a copy of the first product is available at the product pickup area.

In the foregoing method, a retrieval request may be forwarded to an employee of the duty-free store or an automated product retrieval system for retrieving the copy of the product from the product storage area. In the foregoing method, the product pickup area may be a location that is predefined prior to the payment transaction or may be an area adjacent to a gate that the customer provides during the payment transaction. The method may further comprise verifying customer identification and flight information by checking a boarding pass of the customer.

In the foregoing method, the product storage area may be within the secure zone or accessible to the secure zone without passing the security checkpoint, or may be annexed to the product storage area. In the foregoing method, the product storage area may store copies of variations of the first product, and wherein the first customer's capturing of the first unique identification code provides first product variation information indicative of the variations of the first product, the first request comprising the first product variation information. In the foregoing method, the product storage area may be remote from the duty-free store, or may be annexed to or accessible from the duty-free store. In the foregoing method, the product pickup area may be remote from the duty-free store, or may be annexed to or accessible from the duty-free store. In the foregoing method, a single copy of a product may be displayed in the duty-free store, or multiple copies of a product are displayed in the duty-free store.

The foregoing method may further comprise: subsequent to performing the payment transaction for the sale of the first product, receiving, by the computing system associated with the duty-free store, a second request for initiating a purchase transaction, the second request being created and sent from the mobile computing device of the first customer, the second request comprising additional product information indicative of a second product; and in response to the second request, updating the first database entry associated with the first request, the first database entry comprising the first product information.

The method of operating a retail store disclosed herein provides a method that combines the advantages of both online and traditional retailers. More specifically, embodiments of the invention provide a novel way of operating a traditional retail store using mobile devices and product identification codes to maximize store offerings while providing customers with easy browsing methods and the option to physically observe products before purchasing.

One aspect of the invention provides one or more retail stores of a single franchise. One retail store comprises: a customer shopping area and a non-customer storage area annexed to the customer shopping area. The customer shopping area is open to customers for shopping, and the non-customer storage space area is inaccessible to customers for shopping and specially adapted for storing products for sale in the retail store. The retail store further comprises a computer system and a database connected to the computer system. The database contains information of the one or more predetermined variations of the first product. The computer system and database individually may be located in the retail store or remotely.

Another aspect of the invention provides a mobile application running on a mobile device for interfacing between a customer carrying the mobile device and a computer system associated with the retail store. The mobile application is capable of inputting a unique production identification code and providing information of products for sale in the retail store.

Another aspect of the invention provides a method of running retail operation. The method comprises: displaying products for sale in the customer shopping area, the products comprising a first product and a second product, wherein at least one copy of the first product is displayed in the customer shopping area, wherein at least one copy of the second product is displayed in the customer shopping area; displaying a first unique product identification code associated with the first product and a second unique product identification code associated with the second product, wherein the first unique product identification code is displayed next to or on the at least one copy of the first product, wherein the second unique product identification code is displayed next to or on the at least one copy of the second product; and storing additional products for sale in the non-customer storage area in accordance with a predetermined organization specially adapted for storing products, the additional products comprising one or more predetermined variations of the first product.

A further aspect of the invention provides a method of running retail operation with all or part of the foregoing features and additional features defined below. The method may comprise; receiving, from the mobile application of the mobile device, a request for information of variation products of the first product (a first variation product information request), which may comprise the first unique product identification code; subsequent to receipt of the first variation product information request, providing information of the one or more predetermined variations of the first product to the mobile device for displaying thereon; receiving a request for retrieval of a variation of the first product (a first variation product retrieval request) from the mobile application of the mobile device; subsequent to receipt of the first variation product retrieval request, retrieving a copy of the one or more predetermined variations of the first product from the non-customer storage area and placing the retrieved copy at a predetermined location of the retail store for the customer's examination; and processing to check out the retrieved copy in the retail store.

The foregoing method may further comprise: receiving, from the mobile application of the mobile device, a request for information of variation products of the second product (a second variation product information request), which may comprise the second unique product identification code; subsequent to receipt of the second variation product information request, providing information of the one or more predetermined variations of the second product to the mobile device for displaying thereon; and wherein the one or more predetermined variations of the second product may comprise a first predetermined variation of the second product and a second predetermined variation of the second product, the first predetermined variation and the second predetermined variation are identical to each other except that they are different from each other in one or more characteristics selected from the group consisting of size, color, gender-specificity, left/right orientation, and existence/non-existence of add-ons.

The method may further comprise: receiving a request for retrieval of a variation of the second product (a second variation product retrieval request) from the mobile application of the mobile device; subsequent to receipt of the second variation product retrieval request, retrieving a copy of the one or more predetermined variations of the second product from the non-customer storage area and placing the retrieved copy of the one or more predetermined variations of the second product at a predetermined location of the retail store; and processing to check out the retrieved copy of the one or more predetermined variations of the second product in the retail store. In the foregoing method, the information of the one or more predetermined variations may comprise that the first predetermined variation of the second product not available in stock for purchase at the present time within the store. The mobile application may provide a transaction environment in which the customer performs at least one transaction relating to the first predetermined variation of the second product selected from the group consisting of: reserving the first predetermined variation of the second product for purchase at a subsequent visit to the retail store; purchasing the first predetermined variation of the second product for pickup at a later time at the retail store; purchasing the first predetermined variation of the second product for delivery to a location designated by the customer; reserving the first predetermined variation of the second product for purchase at another retail store of the same franchise as the original retail store; and purchasing the first predetermined variation of the second product for pick-up at another retail store of the same franchise as the original retail store.

In the foregoing method, the one or more predetermined variations may comprise a first predetermined variation of the first product and a second predetermined variation of the first product, the first predetermined variation and the second predetermined variation are identical to each other except that they are different from each other in one or more characteristics selected from the group consisting of size, color, gender-specificity, left/right orientation, and existence/non-existence of add-ons. The information of the one or more predetermined variations may comprise that the first predetermined variation is stored in the non-customer storage area and that the second predetermined variation is stored in the customer shopping area, wherein the first predetermined variation product retrieval request identifies the first predetermined variation for retrieval, and a copy of the first predetermined variation is retrieved from the non-customer storage area. The information of the one or more predetermined variations may further comprise information relating to a location of the second predetermined variation within the customer shopping area.

In the foregoing method, the first predetermined variation product retrieval request identifies the first predetermined variation for retrieval, and a copy of the first predetermined variation is retrieved from the non-customer storage area, wherein the information of the one or more predetermined variations of the first product may comprise that the second predetermined variation is not in stock at the retail store and further may comprise that the second predetermined variation is available for purchase at a later time at the retail store, wherein the mobile application provides a transaction environment for reserving the second predetermined variation on the mobile device, wherein the method further may comprise: receiving a request for reserving the second predetermined variation, confirming the requested reservation of the second predetermined variation, and subsequently completing a sales transaction with the customer at a later time when the second predetermined variation is available at the retail store.

In the foregoing method, the first predetermined variation product retrieval request identifies the first predetermined variation for retrieval, and a copy of the first predetermined variation is retrieved from the non-customer storage area, wherein the information of the one or more predetermined variations of the first product may comprise that the second predetermined variation is not in stock at the retail store and further may comprise that the second predetermined variation is available for purchase at the present time for pick-up at a later time or for delivery to a location designated by the customer, wherein the mobile application provides a transaction environment for purchasing the second predetermined variation on the mobile device, wherein the method further may comprise performing a sales transaction with the customer for pick-up of the second predetermined variation at a later time or for delivery to a location designated by the customer.

In the foregoing method, the first predetermined variation product retrieval request identifies the first predetermined variation for retrieval, and a copy of the first predetermined variation is retrieved from the non-customer storage area, wherein the information of the one or more predetermined variations of the first product may comprise that the second predetermined variation is not in stock at the retail store and further may comprise that the second predetermined variation is available at another retail store of the same franchise as the original retail store, wherein the mobile application provides a transaction environment for reserving the second predetermined variation on the mobile device for purchasing at the other retail store or for purchase of the second predetermined variation of the mobile device at the present time for pick-up at the other retail store or for delivery of the second predetermined variation to a location designated by the customer.

In the foregoing method, in response to the first variation product retrieval request, the method further may comprise: generating a unique retrieval request identification code that identifies the first variation product retrieval request; and sending the unique retrieval request identification code to the mobile application. The unique retrieval request identification code further identifies the particular mobile device, the particular mobile application and/or the particular customer, from which or who the first variation product retrieval request has been made. The method may further comprise storing, in the computer system, the unique retrieval request identification code in connection with the first variation product retrieval request. Subsequent to placing the retrieved copy, the method further comprises checking-out the retrieved copy at the predetermined location to the customer for examination. In the foregoing method, checking-out the retrieved copy may comprise identifying the retrieved copy using the unique retrieval request identification code. In the foregoing method, checking-out the retrieved copy may uses the unique retrieval request identification code to identify the particular mobile device, the particular mobile application and/or the particular customer, from which or who the first variation product retrieval request has been made.

In response to the first variation product retrieval request, the method may comprise estimating a time to placing the retrieved copy at the predetermined location and sending the estimated time to the mobile application. The estimated time may be determined based on one or more factors selected from the group consisting of number of employees available for retrieving products in the non-customer storage area, location of the one or more predetermined variations of the first product in the non-customer storage area, size of the one or more predetermined variations of the first product, and current backlog of requests for retrieving productions in the non-customer storage area. In response to the first variation product retrieval request, the method further may comprise sending, to the mobile application, information about the predetermined location of the retail store for the customer's examination or information about how to get to the predetermined location from a current location of the mobile device. Subsequent to placing of the retrieved copy at the predetermined location, the method further may comprise permitting the customer to examine the retrieved copy. The one or more variations of the first product may be products that are identical to the first product and different from the first product only in one or more product characteristics selected from the group consisting of size, color, gender-specificity, left/right orientation, and existence/non-existence of add-ons.

In the foregoing method, the computer system may comprise one or more computing devices, which may comprise one or more local or cloud memory devices. Receiving the first variation product information request, providing information of the one or more predetermined variations, and receiving the first variation product retrieval request are performed or coordinated by the computer system. The unique product identification code may be selected from the group consisting of a QR code, a bar code, a number, an alphanumerical code, and a combination of numbers, letters, and symbols. The first unique product identification code may comprise a QR code pre-assigned to the first product, wherein the method further may comprise displaying a first product identification number associated with the first product, wherein upon receipt of the first variation product information request comprising the first unique product identification code, the computer system is caused to conduct a database search using the first product identification number. The first product identification number may be assigned by a manufacturer of the first product or by the retail store.

In the foregoing method, the first variation product information request may comprise inputting the first unique product identification code into the mobile application. The first variation product information request consists essentially of inputting the first unique product identification code into the mobile application. Upon receipt of the first variation product information request, the method further may comprise causing to conduct a search to locate the one or more predetermined variations of the first product from the database. The information of the one or more predetermined variations of the first product displaying on the mobile device may comprise information for each of the one or more predetermined variations of the first product that is available for shopping at the retail store or from the same franchise of the retail store. The information of the one or more predetermined variations of the first product may comprise information of one variation of the first product among the one or more predetermined variations, wherein the information of the one variation may comprise at least one selected from the group consisting of: image of the one variation; availability of the one variation for purchase within the retail store; a location of the one variation if located within the customer shopping area; in which of the customer shopping area and the non-customer storage area the one variation is located; availability of the one variation for purchase within the retail store if located within the non-customer shopping area; and availability of the one variation for examination by the customer within the retail store if located within the non-customer shopping area. The information of the one variation may be displayed on the mobile device along with a button for making a request for retrieval from the non-customer storage area to the predetermined location for pick-up by the customer.

In the foregoing method, the first variation product retrieval request may comprise a selection of one of the one or more predetermined variations of the first product on the mobile application. In response to the first variation product retrieval request, the method may further comprise conducting a database search to see if the selected variation of the first product is available in the retail store. The first variation product retrieval request may comprise a selection of one of the one or more predetermined variations of the first product, wherein the method further may comprise causing to conduct a database search to see if the selected one of the one or more predetermined variations of the first product is presently available in the retail store. The first variation product retrieval request may comprise selection of number of copies of the selected predetermined variation of the first product. In response to the first variation product retrieval request from the mobile application, the exact number of copies of the selected predetermined variation of the first product are retrieved and placed at the predetermined location. In response to the first variation product retrieval request from the mobile application, one or more additional copies of the selected predetermined variation of the first product are retrieved and placed at the predetermined location in addition to the exact number of copies.

In the foregoing method, the first variation product retrieval request from the mobile application is forwarded to an employee of the retail store or an automated product retrieval system for retrieving the selected predetermined variation of the first product from the non-customer storage area. The method may further comprise sending to the employee or the automated product retrieval system additional information of the selected predetermined variation of the first product, wherein the additional information is one or more pieces of information selected from the group consisting of information indicative of a stored location of the selected predetermined variation within the non-customer storage area, information indicative of shape of the selected predetermined variation, information indicative of size of the selected predetermined variation, information indicative of color of the selected predetermined variation, information indicative of shape of a package of the selected predetermined variation, information indicative of size of the package of the selected predetermined variation, and information indicative of color of the package of the selected predetermined variation.

In the foregoing method, subsequent to receipt of the first variation product retrieval request, the method may further comprise formulating and sending a product retrieval command to an employee or an automated product retrieval system, wherein the product retrieval command may comprise information identifying the selected predetermined variation of the first product and information indicative of a stored location of the selected predetermined variation of the first product. The information identifying the selected predetermined variation is a unique identification code specifically assigned to the selected predetermined variation and may comprise one or more selected from the group consisting of a QR code, a bar code, a number, an alphanumerical code, and a combination of numbers, letters, and symbols. The product retrieval command further may comprise information useful for locating the selected predetermined variation, which is one or more pieces of information selected from the group consisting of information indicative of shape of the selected predetermined variation, information indicative of size of the selected predetermined variation, information indicative of color of the selected predetermined variation, information indicative of shape of a package of the selected predetermined variation, information indicative of size of the package of the selected predetermined variation, and information indicative of color of the package of the selected predetermined variation.

A still further aspect of the invention provides a method of running a retail operation. The method comprises: providing a retail store comprising a customer shopping area and a non-customer storage area annexed to the customer shopping area, the customer shopping area being open to customers for shopping, the non-customer storage space area being inaccessible to customers for shopping and specially adapted for storing products for sale in the retail store; displaying products for sale in the customer shopping area, the products comprising a first product and a second product, wherein at least one copy of the first product is displayed in the customer shopping area, wherein at least one copy of the second product is displayed in the customer shopping area; displaying unique product identification codes in connection with products displayed in the customer shopping area, wherein a first unique product identification code is displayed in connection with the first product, and a second unique product identification code is displayed in connection with the second product; storing additional products for sale in the non-customer storage area in accordance with a predetermined organization specially adapted for storing products, the additional products comprising one or more predetermined variations of the first product; providing a database containing information of the one or more predetermined variations of the first product.

The method further comprises: providing a mobile application running on a mobile device for interfacing between a customer carrying the mobile device and a computer system associated with the retail store, the mobile application being capable of generating and sending a product information request in response to inputting a unique product identification code into the mobile device; receiving, from the mobile application of the mobile device, a first request for information of variation products of the first product (a first variation product information request), which comprises the first unique product identification code; subsequent to receipt of the first variation product information request, referring to the database to obtain information of the one or more predetermined variations of the first product and transmitting the obtained information to the mobile device for displaying thereon, wherein the obtained and transmitted information comprises availability of the one or more predetermined variations of the first product by a request for retrieval; receiving a first request for retrieval of a variation of the first product (a first variation product retrieval request) from the mobile application of the mobile device, the first variation product retrieval request comprising selection of one of the one or more predetermined variations of the first product on the mobile application; subsequent to receipt of the first variation product retrieval request, retrieving a copy of the one or more predetermined variations of the first product from the non-customer storage area and placing the retrieved copy at a predetermined location of the retail store for the customer's examination; and processing to check out the retrieved copy in the retail store.

In the foregoing method, the product information request may be a request for information of variation products of the product associated with the inputted unique product identification code. The mobile application may be configured to generate the request for information of variation products automatically without further input from the customer carrying the mobile device when the unique product identification code is inputted into the mobile device. The mobile application is configured to cause sending of the generated request for information of variation products automatically without further input of the customer after generating the request. The information of availability of the one or more predetermined variations of the first product by a request for retrieval may further comprise an estimated time for pick-up from the request for retrieval.

The information of availability of the one or more predetermined variations of the first product may further comprise that the one or more predetermined variations of the first product is available in the non-customer storage area of the retail store. The obtained and transmitted information may comprise unavailability of the one or more predetermined variations of the first product by a request for retrieval. The obtained and transmitted information may comprise availability of the one or more predetermined variations of the first product for purchase and pick-up at a later date. The obtained and transmitted information may comprise availability of the one or more predetermined variations of the first product for purchase and pick-up at another store of the same franchise as the retail store.

The product information request may be selected from the group consisting of a request for information of variation products of the product associated with the inputted unique product identification code, a request for information of related products of the product associated with the inputted unique product identification code and a request for information of both variation and related products of the product associated with the inputted unique product identification code. The mobile application may be configured to generate a selection inquiry when the unique product identification code is inputted to the mobile device, wherein the selection inquiry is for the consumer carrying the mobile device to choose one of the group consisting of a request for information of variation products of the product associated with the inputted unique product identification code, a request for information of related products of the product associated with the inputted unique product identification code and a request for information of both variation and related products of the product associated with the inputted unique product identification code.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects, and advantages of the present invention are described in detail below with reference to the drawings of various embodiments, which are intended to illustrate and not to limit the invention. The drawings comprise the following figures in which.

DETAILED DESCRIPTION OF EMBODIMENTS

Figure 1:
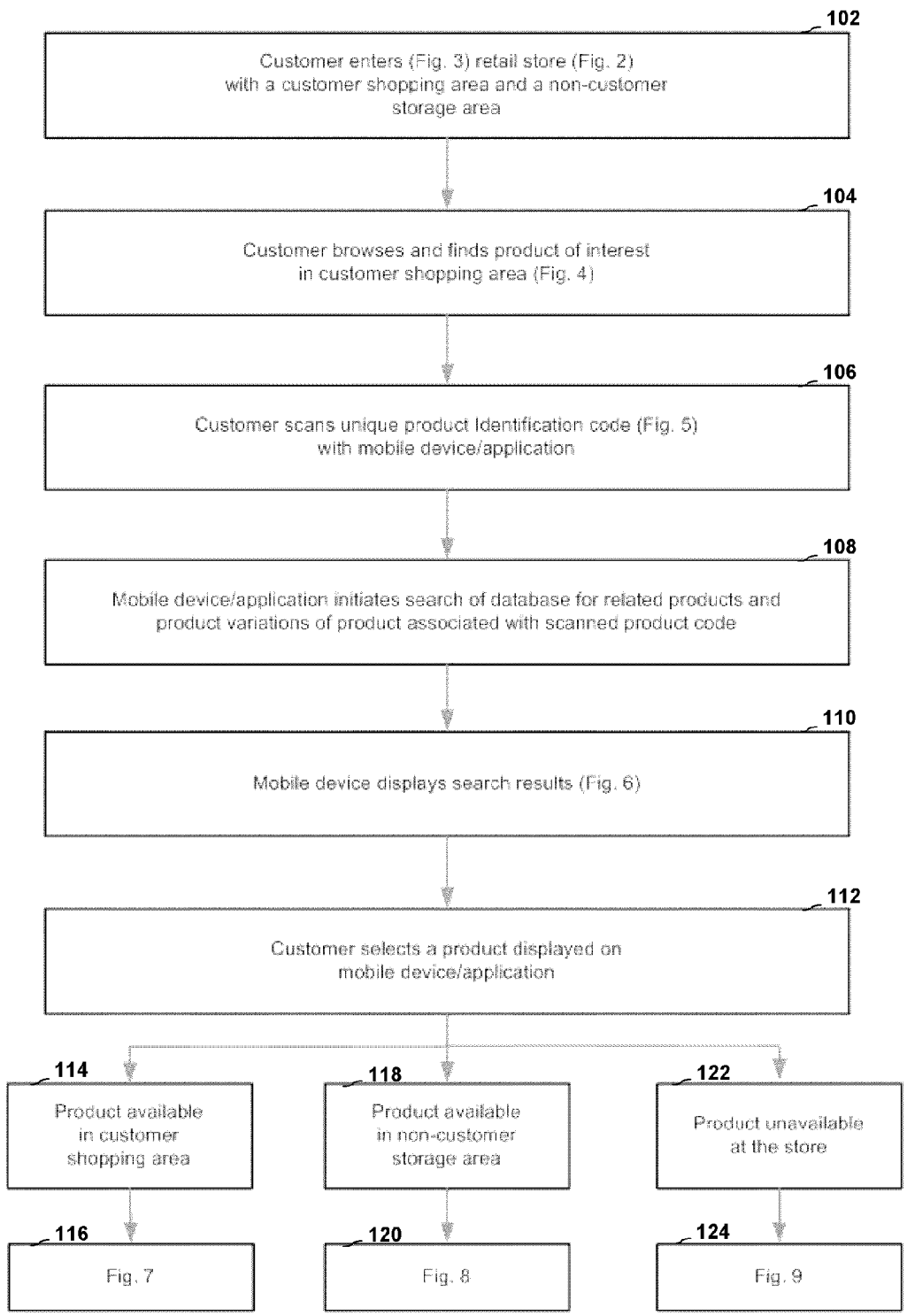
FIG. 1 is a flowchart of retail shopping according to one embodiment of the invention.

Embodiments of the invention will now be described with reference to the accompanying figures. The terminology used in the description presented herein is not intended to be interpreted in any limited or restrictive manner, simply because it is being utilized in conjunction with a detailed description of certain specific embodiments of the invention. Furthermore, embodiments of the invention may comprise several novel features, no single one of which is solely responsible for its desirable attributes or which is essential to practicing the inventions herein described.

With the development of online shopping and the variety of products available for purchase online, traditional retailers which operate physical stores are facing new challenges. For example, online retailers are able to provide a much larger inventory to consumers compared to traditional retailers. This is mainly due to the fact that online retailers do not face restraints of physical space because they do not have to operate a physical showroom of products to consumers. Rather, online retailers can simply operate a warehouse where inventory is stored in the most space-saving, configuration while they display their products through photographs and pictures on a website. A related advantage of online retailers is that consumers can easily browse and compare products on a computer screen despite the larger inventory. Additionally, consumers can easily search for variations of a certain product on the online retailer's website and also easily determine which variations are in stock.

Traditional retailers, on the other hand, generally display their products in a display area that is physically accessible by customers. Operation of a physical display area naturally limits the breadth of inventory any single retail store can carry at a point in time. Meanwhile, even if a traditional retailer does provide a wide variety of merchandise by operating a retail store sufficiently large to display such merchandise, customers may be drawn away by difficulty and time required for browsing through products.

At the same time, however, the availability to physically observe and compare products is one of traditional retailers' main competitive edges over online retailers. This is especially true more so for certain consumer products than others. For example, consumers are more likely to choose a traditional retailer over an online retailer in making purchasing decisions for products with size specifications, such as clothing or shoes, and/or sensitive products, such as baby products.

As such, embodiments of the method of operating a retail store disclosed herein combine the advantages of traditional retailers and those of online retailers. More specifically, embodiments of the method of operating a retail store disclosed herein provide customers with the option to physically examine products prior to purchasing together with a wide variety of merchandise and an easily manageable method of browsing through products. At the same time, embodiments of the method of operating a retail store disclosed herein also provide retail stores ways to provide all the above to customers while saving space to maximize their offerings. Further, certain embodiments take advantage of the growing popularity and development of mobile devices and mobile applications as means to further implement the method of operating a retail store disclosed herein.

According to embodiments described herein, as a customer walks on the street towards a retail store, a mobile application installed on the customer's mobile device starts to recognize the customer's location. Once the mobile application determines the customer's location relative to the retail store, the mobile application can alert the customer or user that the retail store is nearby. The terms "customer" and "user" are used interchangeably herein. The mobile application can display general information about the store, allow the user to browse products available at the store on the mobile device, and also allow the user to search for certain products available at the store on the mobile device.

After the customer enters the retail store, the customer browses through products displayed in the customer shopping area of the store. Once the customer identifies a product of interest, the customer can scan the unique product identification code in the form of a QR code associated with that product using the customer's mobile device. Upon scanning, the mobile application sends an electronic communication or a variation product information request to a remote computer system of the retail store to request information of variation products of the product associated with the unique product identification code. Upon receiving a variation product information request, the computer system of the retail store initiates searching of the retail store's database for information of product variations.

Once the searching is completed, the mobile application, which is still in communication with the retail store's computer system, then receives and displays information of the product associated with the product identification code after receiving such information from the computer system of the retail store. Also, the mobile application displays information of products that are variations of the product associated with the product identification code. The user browses through these products displayed on the user's mobile device and identifies a product that interests the user. The mobile application further informs the user that the selected product is not displayed in the customer shopping area, but is stored in the non-customer storage area. The user then requests delivery of the selected product from the non-customer storage area to a pick-up area within the store.

To do so, the user simply selects a pick-up request option or a product retrieval request on the mobile application. The mobile application then sends the pick-up request wirelessly to a computer system of the retail store. The computer system of the retail store then receives the product retrieval request. In embodiments, the product retrieval request includes information identifying the requested product and number of copies requested for retrieval. Upon receiving the product retrieval request, the computer system of the retail store then electronically forward the pick-up request to a store employee(s) in charge of product retrieval in the non-customer storage area. The employee may receive the pick-up request via a terminal of the computer system or a mobile device. Then, the employee may involve accessing store database for location of the requested product. In the alternative, the computer system generates and sends to a store employee(s) an electronic pick-up command, which includes identification of the requested product, number of requested copies and information indicative of location of the requested product in the non-customer storage area.

In other embodiments, the computer system causes an automated product retrieval system to locate the product in the non-customer storage area and deliver the product to the pick-up area with or without human interactions. Meanwhile, after sending the request to the computer system, the mobile application generates a pick-up request confirmation code in the form of a QR code and sends the pick-up request confirmation code to the computer system. In some embodiments, upon receiving a product retrieval request, the computer system further estimates the time required to locate and deliver the product to the pick-up area and sends the estimated time to the mobile application.

The user then walks over to the pick-up area and scans in the pick-up request confirmation code displayed on the user's mobile device into the pick-up area computer system. The scanning identifies the user and the product the user requested for delivery to the pick-up area. After examining the product, the user either purchases the product at the pick-up area or at a separate check-out counter.

Product Variations and Related Products

In this disclosure, the term "product variation," "variation of a product," or the like refer to the same product having differences in one or more of sizes, colors, left-handed or right-handed orientation, left-footed or right-footed orientation, existence of add-ons, and gender-specificity. The term "related product" or the like refer to different products that are complementary or alternative to a product. In this disclosure, "related products" of a product do not overlap any of "variations" of the particular product.

Mobile Application and Mobile Device

In an embodiment, a mobile application can allow customers and users to access and browse the store merchandise database. In some embodiments, the mobile application can be downloaded, installed, and operated on a mobile device. The mobile device can be a smartphone, such as an iPhone, an Android mobile phone, and a Blackberry, or any other mobile phone. The mobile device can also be a tablet personal computer, such as an iPad, an Android-running tablet, or any other tablet personal computer. In some embodiments, the mobile application can be installed and operated from a device specifically designed and built for the mobile application. In an embodiment, all actions of the mobile application may involve its interaction with a computer system and database associated with a retail store.

Overview of Customer Shopping Experience Using Disclosed Method

FIG. 1 is a flowchart of a customer shopping experience using customer mobile devices and product identification codes in accordance with one embodiment.

In the depicted embodiment, a customer enters a retail store at block 102. In some embodiments, the retail store is divided into two or more separate areas, including a customer shopping area and a non-customer storage area. The customer shopping area is open to customers and holds products available for sale, which is displayed to customers. The non-customer storage area is not open to customers and stores products in a space-saving manner. The terms "customer shopping area" and "non-customer storage area" are defined in further detail below.

Then, at block 104, the customer browses through the products displayed in the customer shopping area. When a customer browses through items displayed at a retail store, the customer's interest level in each product can vary widely. Except for the occasional situation where a customer finds the perfect product in any and every aspect, a customer will most likely find him or herself with a product that the customer somewhat likes but is not completely satisfied with. Or in other situations, a customer may walk into a retail store with only a vague idea of what the customer wants, such as a brand name, color scheme, and/or price range, but is otherwise open as to details.

In any of the situations described above, or for whatever other reason, a customer may wish to find out what other variations or related products of a particular product are available for sale at a retail store or are manufactured and available for sale elsewhere. In one embodiment, only certain variations of a product are displayed in the customer shopping area. In some embodiments, displayed variations can be the most popular variations or the most symbolic variations of a product. In certain embodiments, the displayed variations can be of a certain color, size, orientation, configuration, gender-specificity, and any other exemplary variation. In some embodiments, multiple copies of the same variation are displayed in the customer shopping area such that customers can physically pick up one of a plurality of displayed copies for purchase, but other variations are not displayed at all. Then, from a retailer's point of view, it is desirable to provide to its customers a quick and convenient method of browsing through the store inventory to maximize the chance that a customer finds a product he or she wishes to purchase.

In the depicted embodiment, the retail store allows for a customer to quickly and easily search an internal database of a retail store for any variations or products related to a displayed product using a mobile application installed on a mobile device at block 106. The mobile device can be the customer's own cell phone, smartphone, tablet computer, or the like. In some embodiments, the retail store provides or lends the mobile device to customers. In some embodiments, the customer scans or otherwise inputs a unique product identification code of the desired item into the mobile device or mobile application at block 106.

In some embodiments, although not limited thereto, each product displayed in the customer shopping area has a unique product identification code either on the product or displayed near it. This product identification code can be a QR code, barcode, text, number code, or the like. In some embodiments, if a customer, for whatever reason, wishes to see what variations or related products of a displayed item are available at the retail store, the customer can simply scan the product identification barcode or QR code using his or her own mobile device. In other embodiments, a customer can input the product identification code by typing in the number or text code of a particular product.

In the depicted embodiment, upon scanning or otherwise inputting a product identification code, the mobile device or mobile application then initiates a search of the store inventory database for related products and product variations of the product associated with the inputted product identification code at block 108. In some embodiments, the mobile application sends a variation product information request to a computer system of the store to initiate the search. After searching, the computer system of the store provides information of the search results, product variations, to the mobile device or application. Then, the mobile device or application displays the search results to the customer at block 110 such that the customer can browse through the results. Because all variations and related products found in the search are available to the customer for viewing on a mobile device, the customer can easily and quickly browse through all available variations of that displayed product that initially caught his or her eye.

In the depicted embodiment, the customer can then select a product for further viewing on the mobile device at block 112. In certain embodiments, a selection of a particular item will cause display of more detailed information about the item. In some embodiments, such detailed information can include product price, availability, specifications, reviews, popularity, intended use, safety precautions, related products, and variations of the product, among others.

In one embodiment, the selected item, which is a variation or related product of the displayed product that the customer inputted, is displayed somewhere within the customer shopping area of the retail store. In another embodiment, the selected item is stored only in the non-customer storage area and not in the customer shopping area of the retail store. In an embodiment, some copies of the selected item are displayed somewhere within the customer shopping area and some copies of the selected item are stored in the non-customer storage area of the retail store. In yet another embodiment, the selected item is not currently available for sale at the retail store but is available for delivery or pick-up at a later time.

In an embodiment where the selected item is located within the customer shopping area of the retail store, as represented by block 114, the customer can physically locate the item and pick up the item for purchase at block 116. In some embodiments, the mobile device or application can display to the customer the location of the selected item within the store and/or give detailed directions to the item's location from the customer's current location.

In an embodiment where the selected item is available for sale but is located only within the non-customer storage area of the retail store as represented by block 118, the mobile device or application can display to the customer an option to pick up and physically observe the item at block 120. In some embodiments, once the customer requests pick-up of the selected product from the non-customer storage area, the mobile application sends a variation product retrieval request to the computer system of the store. Then, in certain embodiments, the mobile device or application displays a pick-up request confirmation code that the customer can use to pick up the item at a pick-up area within the store.

In an embodiment where the selected item is currently out of stock or is otherwise unavailable for sale at that particular retail store as represented by block 122, the mobile device or application can display further options and information to the customer at block 124. For example, in some embodiments, the mobile device or application estimates when the selected product will be available for sale or in-stock. In other embodiments, the mobile device or application allows the user to select delivery or pick-up options at a later time.

Overview of Retail Store Employing Disclosed Method

Figure 2:
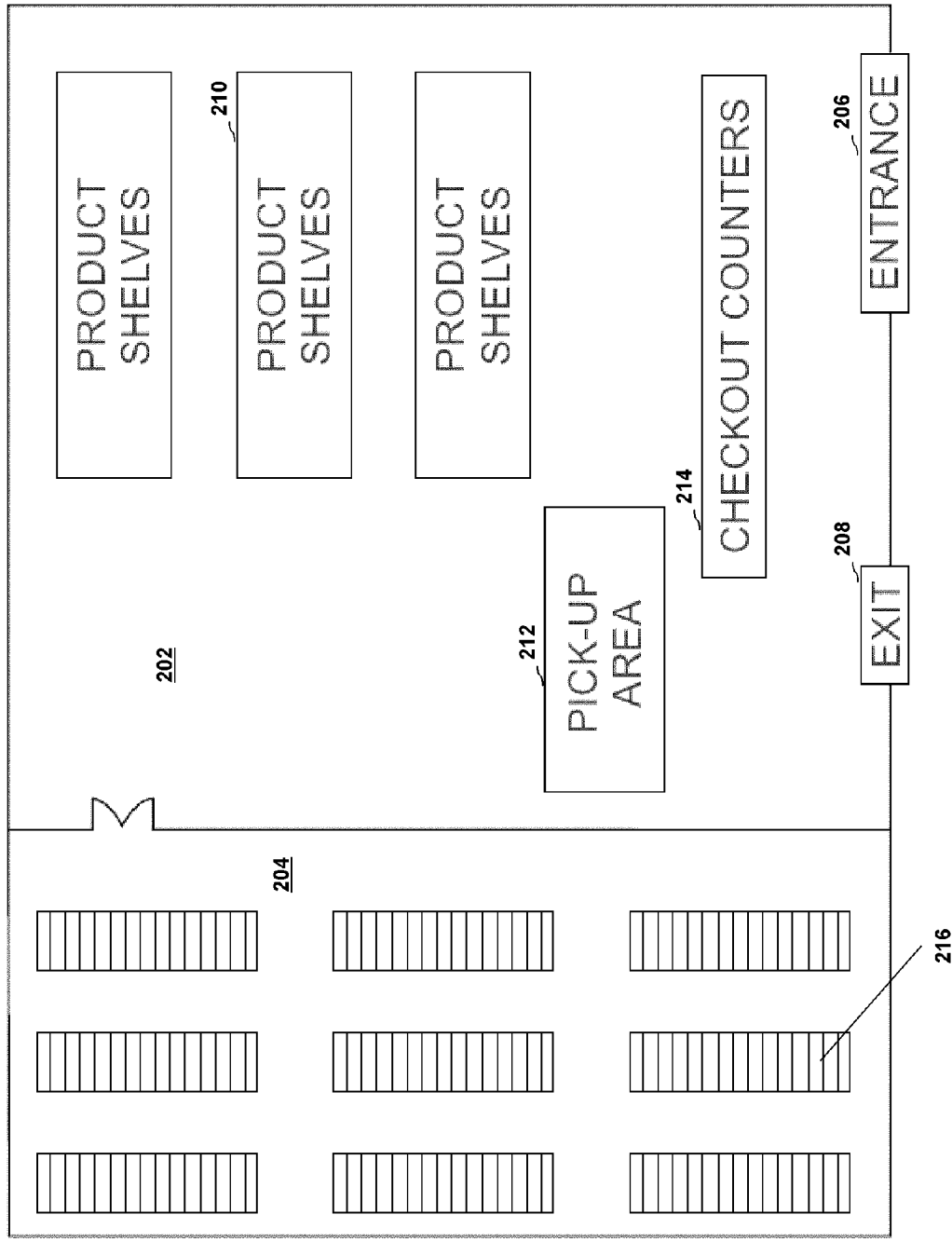
FIG. 2 depicts a retail store with a customer shopping area separate from a non-customer storage area according to one embodiment of the invention.

FIG. 2 depicts a retail store configured in accordance with one embodiment. The illustrated retail store includes a customer shopping area 202 and a non-customer storage area 204 that are separate from each other.

In the illustrated embodiment, the customer shopping area 202 has a general entrance 206 and a general exit 208 for customers to enter and exit the store. In the embodiment, products available for sale are displayed throughout the customer shopping area 202 on product shelves 210 or any other means currently known or to be developed in the future for displaying products.

In the illustrated embodiment, the retail store has a pick-up area 212. The pick-up area is where a customer picks up a product that is not displayed in the customer shopping area. In one embodiment, the pick-up area 212 is located substantially close to the non-customer storage area 204. In another embodiment, the pick-up area 212 is located substantially close to check-out counters 214 within the customer shopping area. In some embodiments, the pick-up area 212 comprises at least one check-out counter 214 or otherwise allows for customers to make payments and purchase an item at the pick-up area 212. In another embodiment, the retail store does not have a separate pick-up area. Rather, the one or more check-out counters function as a pick-up area.

In some embodiments, the pick-up area 212 has a kiosk, barcode reader, scanner, keyboard, mouse, or some other input method to input a pick-up request confirmation code or page. In an embodiment, upon input of a pick-up request confirmation code or page, a computer system at the pick-up area 212 can identify the product requested for pick-up. In another embodiment, the computer system at the pick-up area 212 can further display the information to the customer for confirmation. Then, an employee of the retail store can use the information to locate and deliver the requested product to the customer. In yet another embodiment, upon inputting the pick-up confirmation code or page, an automated system can use the information to locate and deliver the selected product to the pick-up area. In another embodiment, the pick-up area has shelves upon which items requested for pick-up are placed after an employee locates the item in the non-customer area.

In the illustrated embodiment, the non-customer storage area 204 is physically separated from the customer shopping area 202 by a wall or separation means of some sort. In some embodiments, only employees or particular employees of the retail store are allowed to enter the non-customer storage area 204. In certain embodiments, customers are not allowed to enter the non-customer storage area 204. The non-customer storage area does not refer to all areas that are open to customers. Rather, the non-customer storage area refers to non-customer areas specifically designed to store products for sale in bulk. In embodiments, the non-customer storage area does not include product loading/unloading areas, hallways, and offices that are not designed to store products in bulk. In addition, in some embodiments, the non-customer storage area does not include check-out counters, entrance/exit for customers, or a pick-up area.

In some embodiments, the non-customer storage area 204 stores products in a space-efficient manner in shelves or other storage means 216 such as to maximize the number of products that can be stored. In other embodiments, products stored in the non-customer storage area 204 are organized in a systematic manner such that the location of a particular product or product variation can easily be found by a store employee or automated system. In certain embodiments, the location of each product within the non-customer storage area 204 is stored in a computing system of the retail store.

Location Determination and Related Applications

Figure 3:
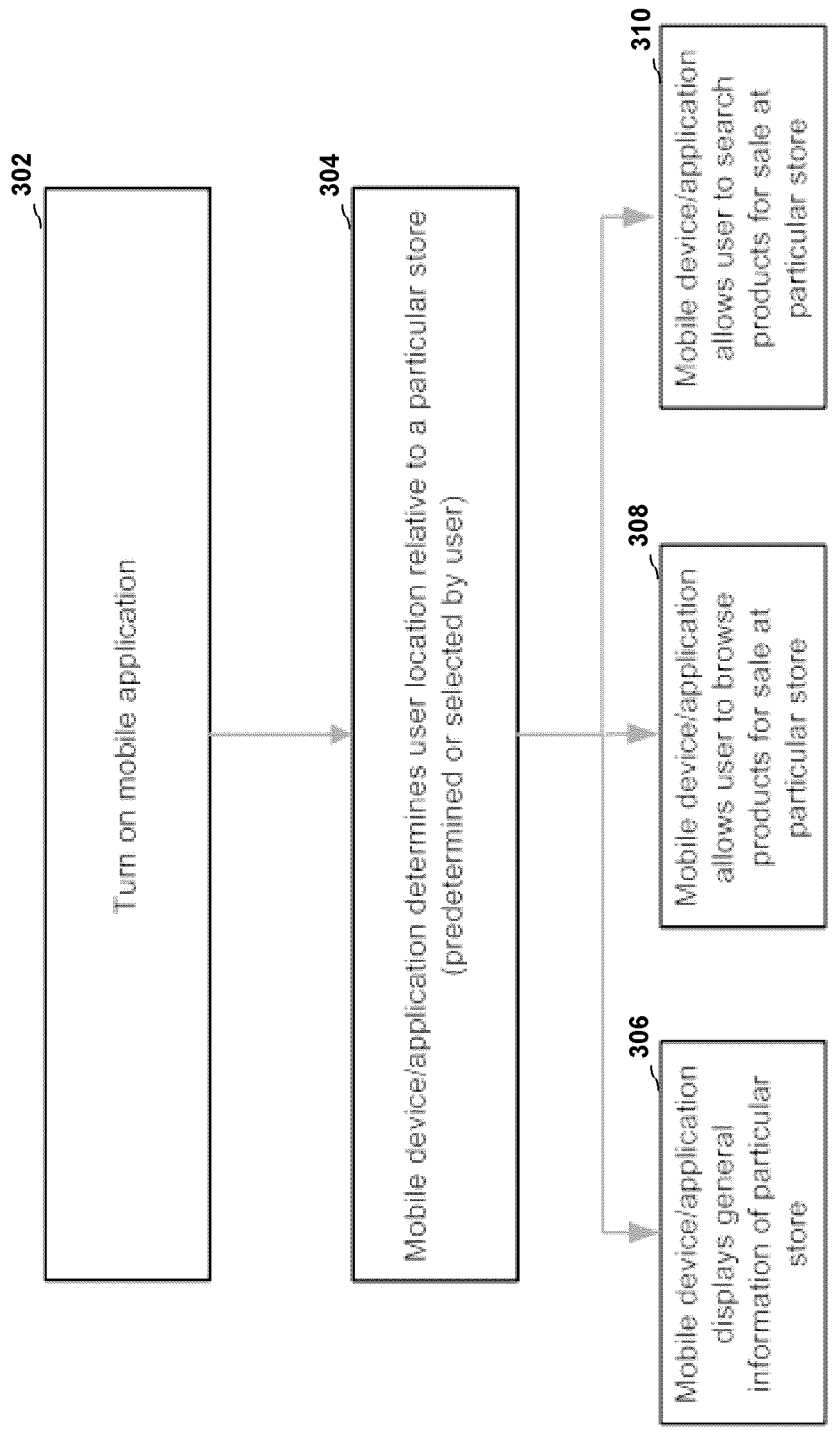
FIG. 3 is a flowchart of determining a user or customer's location and applications related thereto according to one embodiment of the invention.

FIG. 3 is a flowchart of determining a user or customer's location using a mobile device and/or application. In the depicted embodiment, the mobile device includes an application associated with a particular retail store. In some embodiments, the mobile application allows the user to select a particular store. Referring to FIG. 3, when a user or customer turns on a mobile application related to a particular retail store or franchise at block 302, the mobile device or application determines the user's location relative to a particular store as opposed to other stores at block 304.

In some embodiments, the mobile device or application utilizes GPS functions available on the mobile device to determine the user's location. In other embodiments, the mobile device or application utilizes wi-fi connections available nearby to determine the user's location. In yet other embodiments, the mobile device or application utilizes the mobile device's service provider network to determine the user's location. In some embodiments, the mobile device or application communicates with a sensor or some sort of tracking device located within a particular store to determine the user's location when the user is sufficiently close to that retail store.

In certain embodiments, when a customer is near a particular retail store of the franchise, the mobile application automatically turns on and determines the user's location relative to the particular retail store. For example, the mobile application automatically can turn on and determine the user's location relative to a particular store when the user is within a preset distance from a position of the particular store. In some embodiments, the mobile device or application alerts the user when the user is substantially near a retail store of the franchise at block 304. In certain embodiments, this automatic alerting system can be turned on or off by the user.

In order to determine the location of a user relative to a particular store as opposed to other stores, the mobile device or application in some embodiments first determines the user's location employing any of the methods described above. Then, in certain embodiments, the mobile device or application determines the user's distance from a particular store. In some embodiments, the particular store is predetermined and saved on the mobile device or application. In other embodiments, the particular store is selected by the user. In yet other embodiments, the mobile device or application automatically selects a particular retail store that is closest to the user's current location. In certain embodiments, the mobile device or application automatically selects the particular retail store that the user is currently inside.

Once the mobile application is turned on, the mobile device or application begins to communicate with a computer system associated with the retail store to provide information to the mobile device or application.

In an embodiment, upon determining the user's location relative to a particular store, the mobile application then displays general information about that particular retail store at block 306. Such general information can include, among others, the opening and closing times of the retail store, categories or types of merchandise available for sale at the retail store, and categories or types of services available at the retail store including product delivery options, order options, payment options, bulk purchase options, among others.

In another embodiment, the mobile application can display the location and information of different retail stores other than the particular retail store that is either predetermined or selected by the user. Such information can include, among others, the opening and closing times of the other retail stores, categories or types of merchandise available for sale at the other retail stores, and categories or types of services available at the other retail stores including product delivery options, order options, payment options, bulk purchase options, among others.

In an embodiment, upon determining the user's location relative to a particular store, the mobile application automatically displays one or more products available for sale at the particular store at block 308. In an embodiment, the mobile application allows the user to search for certain products available for sale at the particular store at block 310.

In some embodiments, once a user selects or searches for a particular product, the mobile application or device then provides the customer with information related to where a particular product is located within the store. For example, the information can include a location of the product represented on a map, description of the location, and directions to get to the product from the mobile device's current location, among others. In other embodiments, the mobile application or devices provides the customer with information related to where product variations and related products of the particular product are located within the store. In certain embodiments, the mobile application or device will display to the customer whether a particular product, its variations, or its related products are located in the customer shopping area 202 or the non-customer storage area 204. In yet other embodiments, the mobile application or device will display to the customer the exact location within the customer shopping area 202 of the particular product, its variations, or its related products.

Access to a Retail Store's Merchandise Database

In an embodiment, the mobile application automatically accesses or connects to a particular store's merchandise database upon determining that the customer is either inside or substantially near a particular store using its location determination feature. In another embodiment, the customer can turn on the mobile application on the mobile device and instruct the mobile device to access or connect to a particular retail store's merchandise database.

In some embodiments, a particular store's merchandise database is only accessible by a mobile application when the mobile device is located within the particular store. In other embodiments, a particular store's merchandise database is only accessible by a mobile application when the mobile device is located substantially near that particular store or within some predefined distance of that particular store.

In other embodiments, the store merchandise database is not generally accessible to the public but is only made accessible via the mobile application. In other embodiments, the store merchandise database is accessible via a website. In some embodiments, the store merchandise database is accessible via a website but only when certain credentials are entered.

In yet another embodiment, the store merchandise database is made accessible only to customers or potential customers who meet certain criteria or who enter certain credentials. In another embodiment, the store merchandise database is accessible only by employees of the particular store or other retail stores of the same franchise.

Mobile Application Download Notification

In one embodiment, the mobile device includes a general mobile application that can initiate certain follow-up processes when the mobile device is located within or is sufficiently near a particular store. For example, the general mobile application can determine the user's location relative to a store by employing any of the location determination methods described above, including but not limited to GPS, wi-fi, mobile device's service provider network, or sensor or tracking device within a particular retail store. Then, in one embodiment, the general mobile application can perform a search to determine whether that particular store has a specific mobile application associated with the store. If so, the general mobile application can alert or notify the user to download and install a mobile application specifically related to that particular retail store. In one embodiment, the mobile device or general mobile application alerts or notifies the user to download and install the mobile application specifically associated with the particular store once the user scans or otherwise inputs a product identification code using the mobile device.

Retail Store Merchandise Database

In an embodiment, the store merchandise database includes information of products that are available for sale at that particular retail store. In one embodiment, the store merchandise database may also include information of products that were previously available for sale or will be available for sale in the future at the particular retail store. In one embodiment, the store merchandise database may further include products that are currently unavailable for sale at the store but are available for pick-up or delivery at a later time. In yet one embodiment, the store merchandise database includes products that are temporarily or permanently out of stock at a particular retail store. The store merchandise database can be comprehensive including all products or can be selective and only include some subgroup of the products being offered for sale at a store. This subgroup can be for any particular type(s) of product, by the date the database is updated, or any random selection.

In an embodiment, the store merchandise database is updated periodically. The store merchandise database can be updated instantaneously, about every 1 minute, about every 5 minutes, about every 10 minutes, about every 30 minutes, about every 1 hour, about every 2 hours, twice a day, once a day, twice a week, once a week, once every two weeks, once a month, or a period between any of the two aforementioned periods.

The store merchandise database can include a variety of information. In an embodiment, the store merchandise database includes information regarding whether a particular product is in stock or is out of stock. In embodiments, the store merchandise database can include information about available or unavailable sizes, available or unavailable colors, available or unavailable orientation, or available or unavailable gender specific variations, among others. In certain embodiments, the store merchandise database includes information regarding the exact location of a particular product within the customer shopping area within the store. In other embodiments, the store merchandise database includes information regarding whether a particular product is located within the customer shopping area or the non-customer storage area. In some embodiments, the store merchandise database can also include any of the aforementioned information about products available or unavailable at franchise retail stores other than its own.

Product Identification Codes

Figure 4:
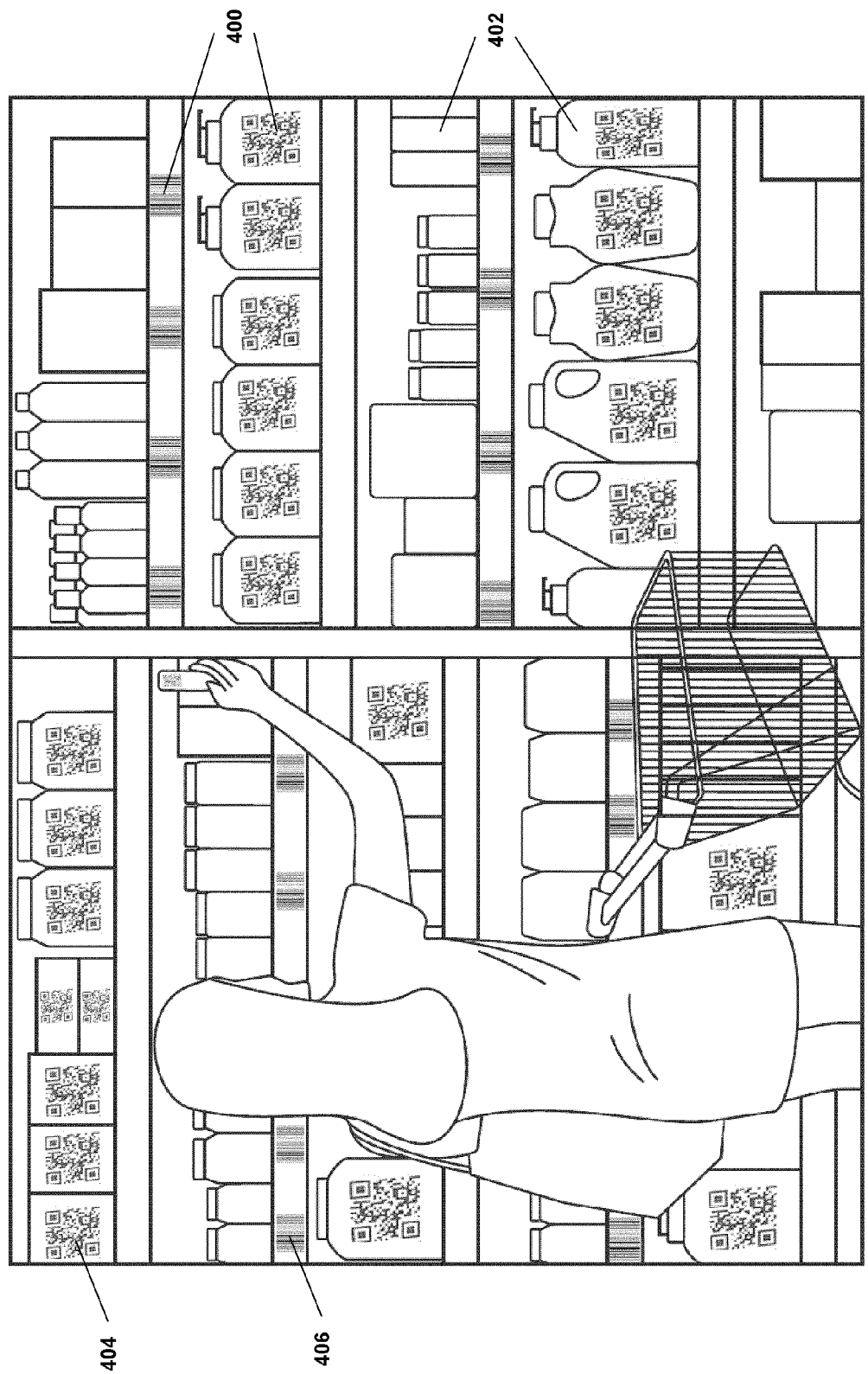
FIG. 4 depicts products displayed on shelves within a retail store in accordance with an embodiment of the invention.

FIG. 4 depicts products displayed on shelves of a retail store with product identification codes 400 attached on or near the products. In one embodiment, a product identification code 400 is located on or near every product 402. In another embodiment, product identification codes 400 are placed only on some of the products. In yet other embodiments, only one or a few product identification codes 400 are placed near each group of the same product. In certain embodiments, a sign of some sort is present near or on the product identification code 400 that informs a customer that product variations and/or products related to the displayed product exist.

In some embodiments, the product identification code 400 is a QR code 404, a barcode, a two-dimensional barcode 406, a product number, a product code, or any code that is capable of identifying the product. In one embodiment, a particular product identification code 400 is assigned for each product. In one embodiment, a particular product identification code 400 is assigned for each type of products. The product identification code 400 can be of any form currently existing or to be developed in the future. In certain embodiments, the product identification code 400 is assigned by a manufacturer, the retail store, or a third-party provider.

In some embodiments, product identification codes 400 associated with certain groups of products can have a common element, such as a common numbering code, text code, or pattern in a barcode or QR code. For example, in some embodiments, all variations of the same product can have a common element. In other embodiments, products of a same genus or type can have a common element.

Figure 5:
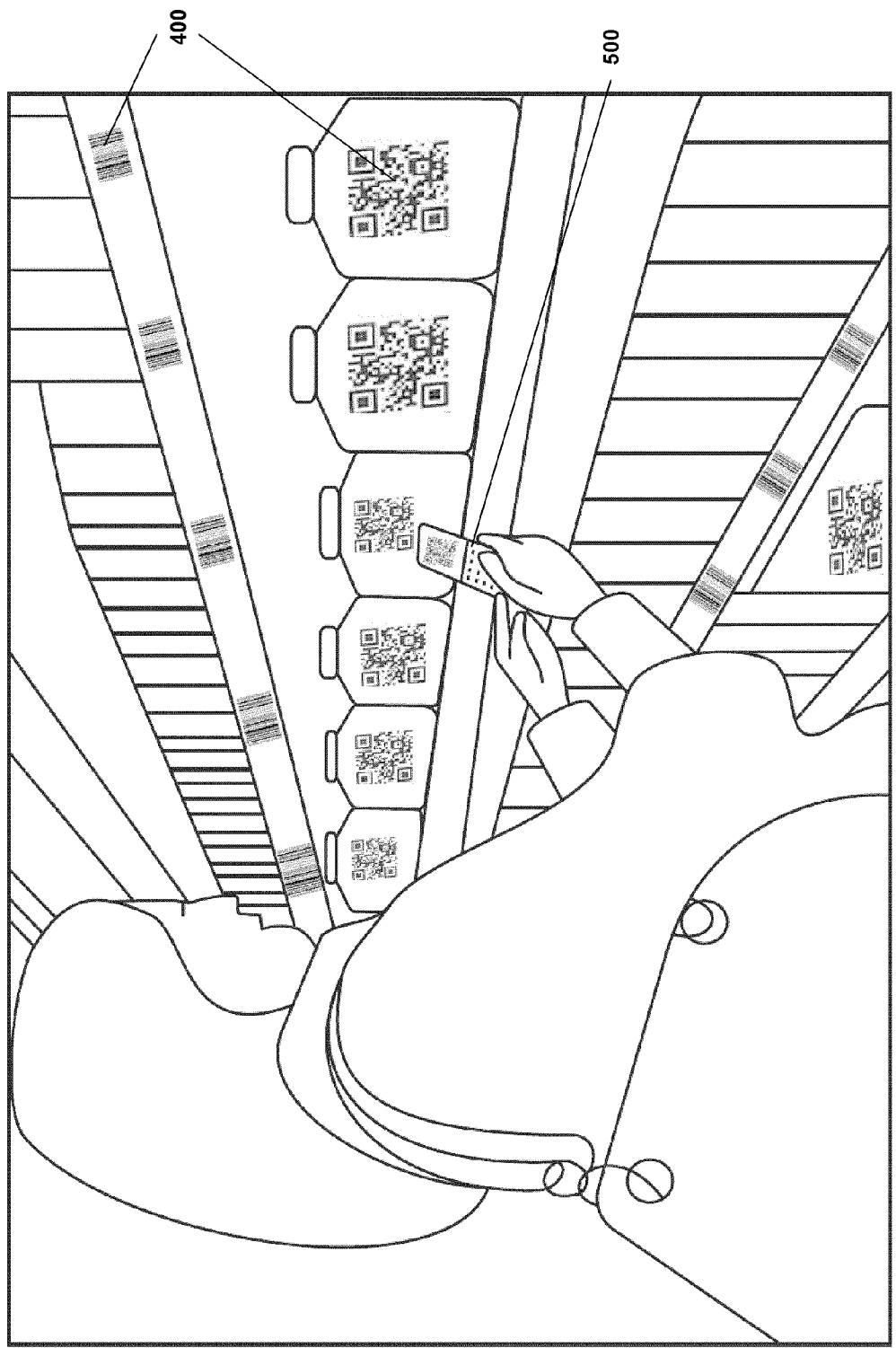
FIG. 5 depicts inputting a product information code into a mobile device by a customer according to one embodiment of the invention.

FIG. 5 depicts inputting a product information code 400 into a mobile device 500 by a customer. In certain embodiments, a customer can scan or otherwise input a product identification code 400 into a mobile application of a mobile device 500 to identify the product associated with the product identification code 400. In some embodiments, a customer can use a camera on the customer's mobile device 500 to take a picture of and scan in the product information code 400. In other embodiments, a customer can otherwise type in the product identification code 400.

Once a product information code 400 is inputted, the mobile device or application wirelessly communicates with the computer system of the retail store to initiate searching of the retail store database. In some embodiments, the mobile application can identify the product associated with the product identification code 400 based on the inputted product identification code 400. In other embodiments, the product identification code 400, when inputted, further triggers the mobile application to display products other than the product associated with the product identification code 400. For example, the other products are variations or related products of the product associated with the product identification code 400 that are available for sale at the particular retail store or from the same merchant. In other embodiments, the product identification code 400 when inputted into a mobile application triggers the mobile application to display further information related to the product, product variations, and/or products related to the product associated with the product identification code 400. In some embodiments, such information displayed by the mobile application can include price, availability and information of stock, description of the product, availability and information of related products, among others.

In some embodiments, a product identification code 400 can be scanned or inputted into the retail store's computer system to identify the product associated with the product identification code 400. The retail store's computer system can be accessed at the pick-up area, check-out area, or by any computer system that can connect to the retail store's internal computer database. Upon scanning or inputting, in some embodiments, the retail's store computer system can identify the product associated with the product identification code 400 and information related thereto. In other embodiments, the product identification code 400, when inputted, further triggers the computer system to display products related to or variations of the product associated with the product identification code 400 that are available for sale at the particular retail store or from the same merchant. In other embodiments, the product identification code 400 when inputted into a computer system triggers the computer system to display information related to the product, product variations, and/or products related to the product associated with the product identification code 400. In some embodiments, such information displayed by the computer system can include price, availability and information of stock, description of the product, availability and information of related products, among others.

Browsing Products on Mobile Application

Figure 6:
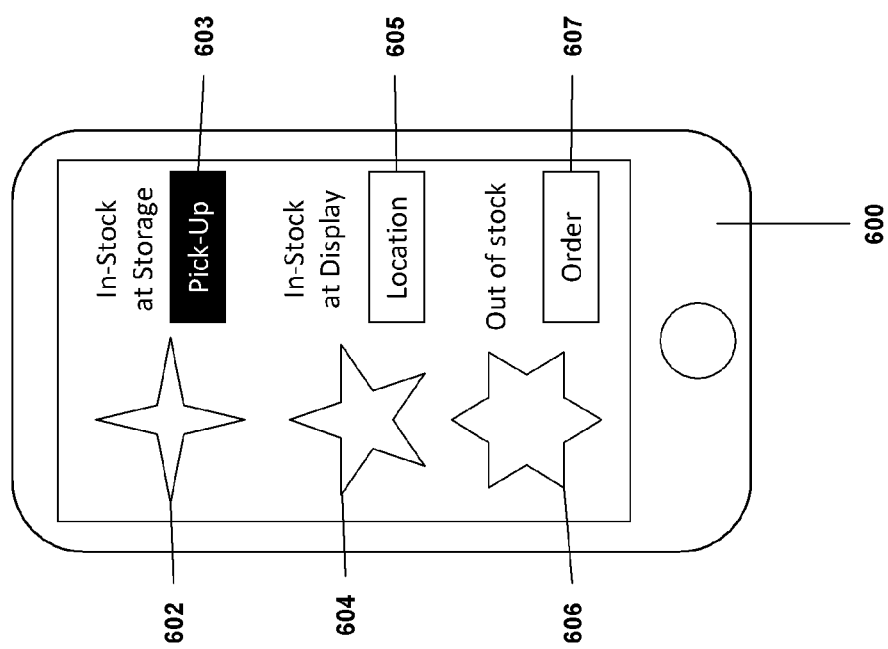
FIG. 6 depicts a mobile application display according to one embodiment of the invention.

FIG. 6 depicts information displayed on a mobile device. In the illustrated embodiment, the mobile application 600 displays product images 602, 604, 606. The mobile application may display only one product on its screen. In embodiments, the product images can take various forms, designs, and configurations.

In some embodiments, the mobile application 600 displays a particular product that is associated with the inputted product identification code. In other embodiments, the mobile application 600 displays products that are variations of and/or related to a particular product identified with the product identification code.

In some embodiments, the mobile application 600 displays products that are currently available for sale at the particular retail store as opposed to others. In other embodiments, the mobile application 600 displays products that are not available for sale at the particular retail store, but are available for pick-up or delivery at a later time from the merchant associated with the retail store as opposed to others. In any event, from the mobile application 600, a user or customer can easily and quickly browse through various products.

In some embodiments, the user or customer can instruct the mobile application 600 to further display more detailed information about a displayed product 602, 604, 606. In certain embodiments, detailed information can include price, availability at the retail store, location of the item within the retail store, availability at other retail stores of the same franchise (the same merchant), product configurations, product specification, product usage, customer reviews, and professional reviews, among others.

In other embodiments, the user or customer can instruct the mobile application 600 to display available options regarding a particular displayed product 602, 604, 606. In some embodiments, such options can include locating the product within the customer shopping area of the retail store, requesting pick-up of an item that is available in the non-customer storage area, purchasing online, purchasing on the mobile application, requesting delivery of the item, and requesting pick-up of the item at a later time, among others.

In some embodiments, the mobile application 600 can display the location and availability of the product selected, for example in-stock or out-of-stock. In the illustrated embodiment, the product 602 is in-stock and located in the non-customer storage area at storage. The product 602 is then eligible for pick up at the product pick-up area. The pick-up button 603 is designed to make a pick-up request, which will be discussed in more detail below. The product 604 is in-stock and located in the customer shopping area at display. The location button 605 is designed to display the location of the product 604 on the mobile application such that the customer can locate the product within the customer shopping area. The product 606 is out of stock. The order button 607 is designed to display delivery or later pick-up options to the customer and to facilitate payment options. The information of availability and location of products may be represented in different format or configuration.

In some embodiments, the mobile application will display only those product variations or related products that are available for sale at the retail store the customer is currently at. In other embodiments, the mobile application will display only those product variations or related products that are available for sale at the retail store the customer is currently at or at other retail stores of the same franchise. In yet other embodiments, the mobile application will display all product variations or related products that are available for sale at any retail store, even if some of those are not available for sale at the retail store the customer is currently at or at other retail stores of the same franchise.

Product Available in Customer Shopping Area

Figure 7:
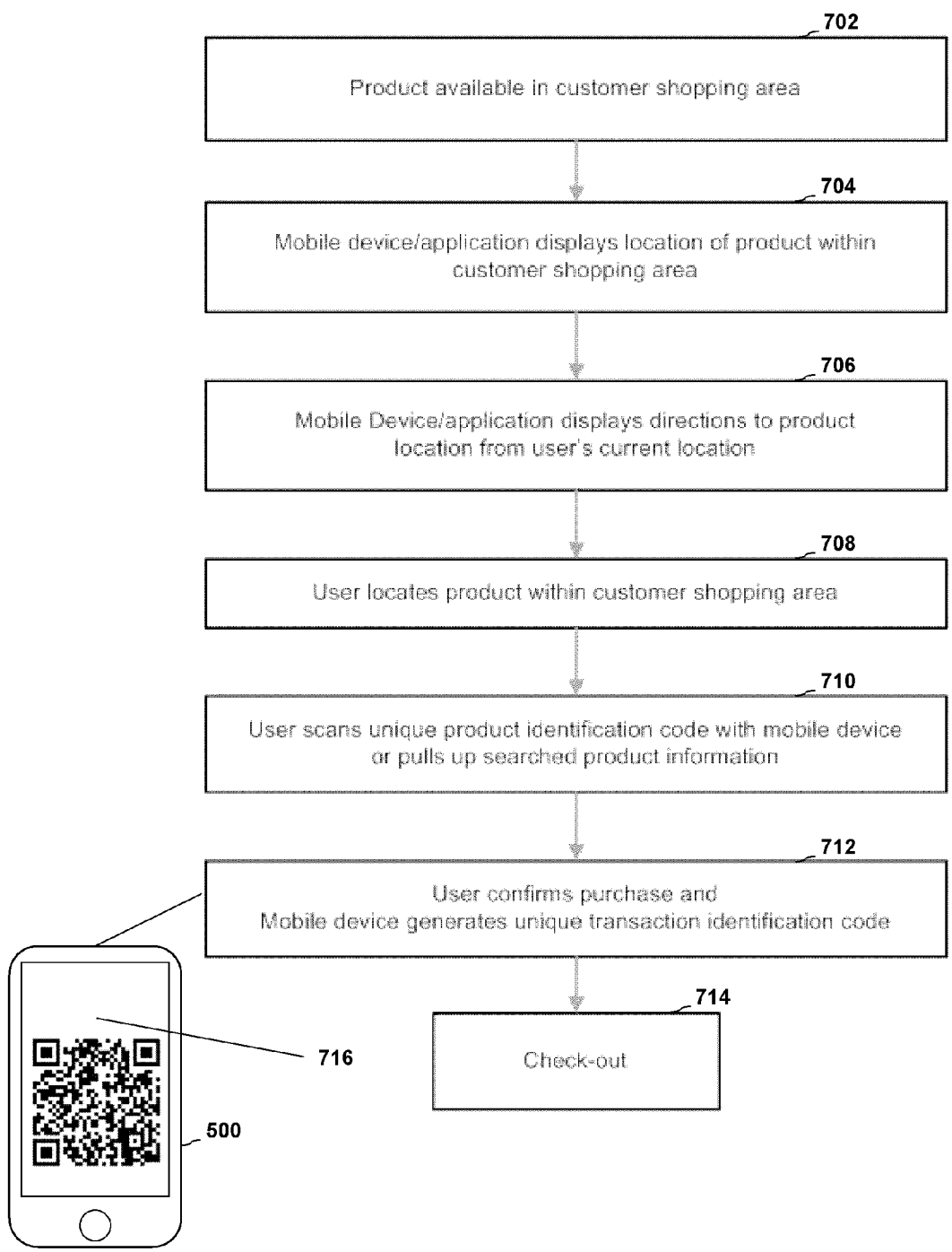
FIG. 7 is a flowchart of locating and purchasing a product according to one embodiment of the invention.

In some embodiments, the product selected by the customer after browsing on the mobile application is available for sale and is located within the customer shopping area 202 of the retail store. FIG. 7 is a flowchart of a method of locating and purchasing a product variation or related product that is available in the customer shopping area of a retail store.

In certain embodiments where the selected product is available within the customer shopping area 202 of the retail store as depicted in block 702, the mobile application then displays to the customer the location of the product within the store at block 704. In certain embodiments, the location of the product displayed by the mobile application can include the section number, aisle number, shelf number, or any other parameter required to locate the item. In another embodiment, the location is represented on a map of the retail store.

In other embodiments, the mobile application can further be configured to give specific directions within the store to the exact location of the selected product variation or related product at block 706. In some embodiments, such directions are updated in real-time as to provide updated directions to the customer. Thus, the customer can easily locate the desired product at block 708 by using the mobile application.

Then, in some embodiments, a user or customer may optionally use a mobile device or application to scan or otherwise input a product identification code located on or near the desired product at block 710. Even though the customer has already located the product to purchase, the customer may still scan in the product identification code in order to obtain a transaction identification code 716 that can be scanned at check-out as opposed to the product itself. Another customer may scan in the product identification code to add the product to a shopping cart code which is discussed in more detail below.

In some embodiments, after scanning, the user confirms desire to purchase at block 712 and the mobile application generates a unique transaction identification code 716. In some embodiments, the unique transaction identification code 716 is a QR code, bar code, number, or text, among others. In certain embodiments, the customer can choose to scan the unique transaction identification code 716 displayed on the mobile application at check-out instead of scanning the product itself. This can be useful when the product is heavy or otherwise difficult to scan.

Once the customer has located the desired product within the customer shopping area 202, the customer can physically observe the product and make a purchasing decision. If the customer wishes to purchase the product, then in some embodiments the customer can walk over to a check-out counter and either scan or otherwise input the product itself or the transaction identification code 716 displayed on the mobile application. Then, the customer can purchase the item at block 714.

In some embodiments, multiple transaction identification codes can be combined to generate a single shopping cart code that is associated with more than one products or items that the customer wishes to purchase such that the customer only has to scan in or otherwise input the single shopping cart code at a check-out counter instead of scanning every product or every transaction identification code. For example, in an embodiment, when a customer locates a first product to purchase within the customer shopping area 202, the customer can scan a first product identification code associated with the first product using a mobile device 500. Then, when the customer finds a second product to purchase, whether in the customer shopping area or in the non-customer storage area through a pick-up area, the customer can scan a second product identification code associated with the second item. Then, upon selection of an option on the mobile application, the mobile application can generate a single shopping cart code that is associated with both the first and second products.

In addition, in other embodiments, the mobile application can display a delivery or pick-up later option to the customer even if the product is available for sale in the customer shopping area 202. After physically observing the product in the customer shopping area 202, the customer can select either the delivery or pick-up later option.

Product Available in Non-Customer Storage Area

Figure 8:
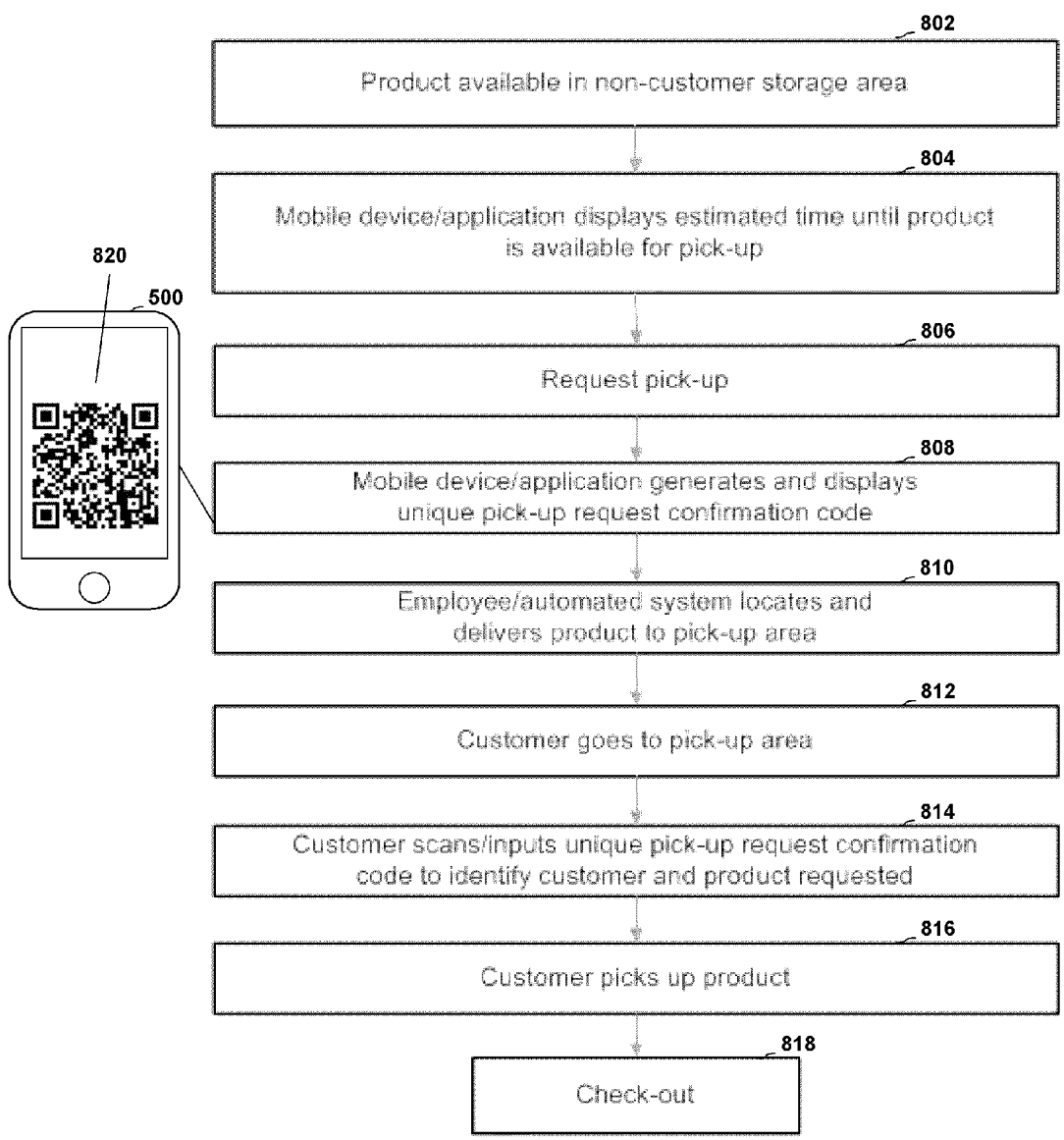
FIG. 8 is a flowchart of requesting for observation and purchasing a product according to one embodiment of the invention.

Alternatively, in embodiments, the desired product may be available for sale at the retail store but located in the non-customer storage area instead of the customer shopping area. FIG. 8 is a flowchart of requesting for observation and purchasing a product that is available in the non-customer storage area of a retail store.

In an embodiment, if the selected product is available for sale at the retail store but is located in the non-customer storage area 204, then upon selection of such item, the mobile application determines and displays to the customer the estimated time it will take for the desired product to be located and delivered to a pick-up area within the customer shopping area 204 of the retail store at block 804. Then, if the customer wishes to wait for the duration of the estimated time to pick up the desired product, either to purchase it or simply to observe it, the customer can request pick-up on the mobile application at block 806. In other embodiments, the mobile application displays the estimated time required for pick-up only after a user or customer requests an item for pick-up.

In some embodiments, once a user or customer requests pick-up (retrieval) of a product stored in the non-customer storage area 204, the pick-up request (or retrieval request) is sent from the mobile application to the store computing system. Once the pick-up request is received by the store computing system, in an embodiment, the store computing system displays the pick-up request on a display for store employees to review. In another embodiment, the store computing system may send a product retrieval command to one or more store employees or an automated system to retrieve the requested product. The command can be sent via e-mail, SMS, text message, pager, telephone call, voice message, or the like. In embodiments, the command includes information of the requested product including location within the non-customer storage area, unique product identification code, shape of the product variation, size of the product variation, color of the product variation, shape of the package of the product variation, size of the package of the product variation, and color of the package of the product variation, among others. In some embodiments, the product pick-up request (or retrieval request) includes the number of copies of the product the customer selected. In such embodiments, either an employee, automated system, or both locates and delivers the exact number of copies of the product variation requested to the pick-up area. In some certain embodiments, the product retrieval command includes the number of copies of the product variation requested. Then, an employee or automated system locates the requested product in the non-customer storage area 204 and delivers it to the pick-up area 212.

In certain embodiments, products stored in the non-customer storage area 204 have product identification codes located either on the product itself or near it. In some embodiments, employees of the retail store can use a device to scan or otherwise input a product identification code of a product stored in the non-customer storage area 204 to identify the product. In certain embodiments, such devices are handheld devices. In other embodiments, an automated product retrieval system locates a product within the non-customer storage 204 and scans or otherwise inputs a product identification code located on or near the product to confirm the identity of the product. In certain embodiments, the automated product location system can further deliver a located product to a pick-up area 212 within the store.

In some embodiments, the product retrieval command sent to an employee, an automated system, or both includes a unique product retrieval command identification code specifically assigned to the product retrieval command for the selected product variation. In such embodiments, the product retrieval command identification code can be one or more of a QR code, a bar code, a number, an alphanumerical code, and a combination of numbers, letters, and symbols. In such embodiments, the employee or automated system can use the unique product retrieval command identification code to access information regarding the product requested for pick-up and/or the product retrieval command. The unique product retrieval command identification code can be linked to the product information request.

In certain embodiments, once a user or customer requests pick-up of a product stored in the non-customer storage area 204, the mobile application or device 500 generates and displays a unique pick-up (retrieval) request confirmation code 820 at block 808. In certain embodiments, the pick-up confirmation page includes at least one of a QR code 828, barcode, number, text, or any other form of identification. The customer can use this pick-up request confirmation code 820 to identify the customer herself who sent the particular pick-up request and the requested item at a pick-up area 212.

In certain embodiments, the mobile application also displays to the customer the location of the pick-up area and/or directions to the pick-up area from the customer's current location. In some embodiments, the location and/or directions to the pick-up area are displayed on the same page as the pick-up request confirmation code.

In other embodiments, the retail store includes more than one pick-up area 212. In some embodiments, then, the mobile application also provides to the customer which pick-up area 212 the requested item will be available for pick up and when. In certain embodiments, the mobile application can also display the location of the particular pick-up area where the requested item will be available at and/or directions from the customer's current location to that particular pick-up area.

Then, the customer can go to the pick-up area 212 at block 812 to pick up the requested product. In some embodiments, the customer can scan or otherwise input the unique pick-up request confirmation code 820 to an input device of a store computing system at the pick-up area 212. Then, the store computing system identifies the customer and the requested item at block 814. In other embodiments, an employee at the pick-up area 212 scans or otherwise inputs the unique pick-up request confirmation code 820 using an input device. In some embodiments, the input device can be a handheld device or a mobile device although not limited thereto. In an embodiment, an employee of the store then provides the identified product to the customer at the pick-up area 212. In another embodiment, an automated system provides the identified product to the customer at the pick-up area 212. In yet another embodiment, the requested product is stored at the pick-up area 212 for the customer to locate and pick up. In yet another embodiment, an employee places the item(s) requested for pick-up on shelves or the like within the pick-up area. Then, a customer locates the item he or she requested from the shelves with or without identifying the customer. In some such embodiments, a text message or other communication is sent to the mobile device from the store computing system when a requested item is available for pick-up on shelves within the pick-up area.

After picking up the requested item at block 816, in one embodiment, the customer can physically observe the product to make a purchasing decision. If the customer wishes to purchase the product, then in some embodiments the customer can go to a check-out counter and either scan or otherwise input the product itself or the pick-up request confirmation code displayed on the mobile device 500, if any. In some embodiments, the pick-up area 212 includes one or more check-out counters 214 or other means that allow customers to make purchases at the pick-up area 212.

In some embodiments, a single pick-up request confirmation code may be associated with more than one product requested for pick-up. For example, if a customer scans or otherwise inputs multiple product identification codes with the customer's mobile device, the mobile application, in some embodiments, will generate a single pick-up request confirmation code that can identify all inputted products instead of generating multiple pick-up request confirmation codes. Then, in such embodiments, a customer can simply scan or otherwise input the single pick-up request confirmation code at a pick-up area 212 to pick up all items requested for pick-up. Also, if a single pick-up request confirmation code is associated with multiple products, then in some embodiments, the customer can simply scan or otherwise input the single pick-up request confirmation code at a check-out counter 214 to identify all associated items, rather than scanning every item.

In addition, in other embodiments, the mobile application can display a delivery or pick-up later option to the customer even if the product is available in the non-customer storage area 204. In some embodiments, after physically observing the product after pick-up at the pick-up area 212, the customer can select either the delivery or pick-up later option.

Product Unavailable at Retail Store

Figure 9:
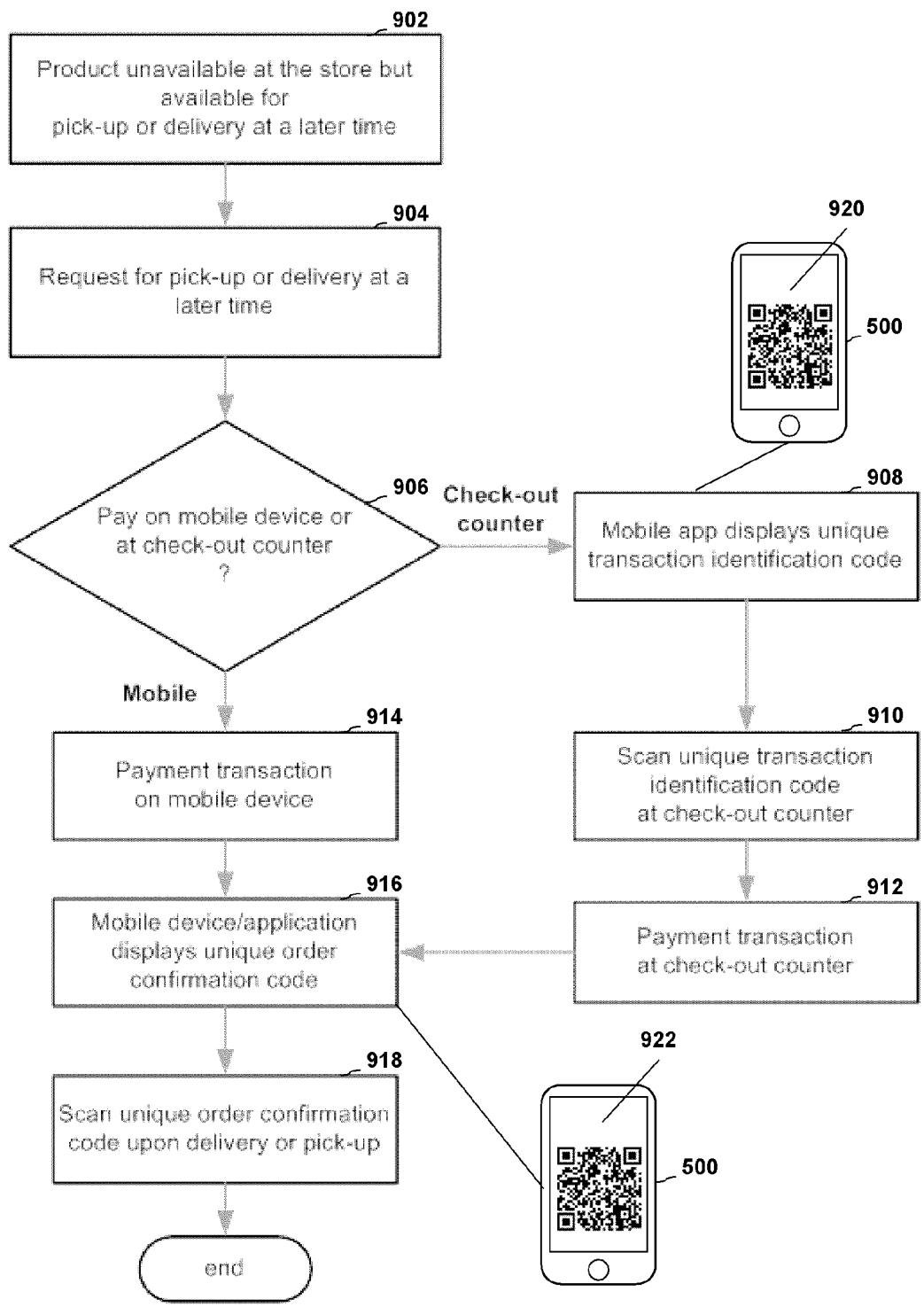
FIG. 9 is a flowchart of ordering and purchasing a product according to one embodiment of the invention.

In certain embodiments, the desired product may not be in stock or otherwise currently unavailable for sale at the retail store, but is available for deliver or pick-up at a later time. FIG. 9 is a flowchart of ordering and purchasing a product that is not available for sale in a retail store.

In some embodiments, even if a product variation or a related product is currently unavailable for sale at a retail store, the customer can still find that product variation or related product displayed on a mobile application. Then, in certain embodiments, the customer can request that product be delivered or request pick-up at a later time at block 904. In some embodiments, the mobile application will display delivery or later pick-up options to the user or customer.

In some embodiments, if the customer requests to pick-up a currently unavailable product at a later time on the mobile application, the mobile application sends the request to the store computing system. Then, in certain embodiments, the store computing system determines the earliest possible estimated time for picking up the requested product. In some embodiments, this estimated time can be subsequently sent to the mobile application, which can then display it to the user. In other embodiments, the earliest available pick-up time is estimated and displayed to a user or customer before the user makes a purchasing decision.

In estimating the earliest available time for pick-up at a certain pick-up location, some embodiments take into account factors such as availability of the item at other retail stores of the same franchise, availability of the item at other non-franchise retail stores, availability of the item on the manufacturer's end, time required to transport and receive the item at each location, weather forecast, and distance to a pick-up location from the location of the item, among others. In certain embodiments, available pick-up locations are pre-stored such that the user must select one from the given options. In some embodiments, pick-up locations can include any retail store of the franchise or any other pick-up center that the franchise operates.

Then, in some embodiments, the customer selects a time and a place to later pick-up the desired product. In some embodiments, the mobile application displays fields where the customer can input the time and place to later pick up the desired product(s). In certain embodiments, this display can include input fields for pick-up location, pick-up time, persons approved to pick up, and special packaging options, among others. In some embodiments, pick-up of the product at a later time may be available at the same retail store, other retail stores of the same franchise as the original retail store, any other remote pick-up post operated by the retail store or third party. In certain embodiments where later pick-up of a currently unavailable product is selected, the customer can reserve the product variation and make a payment when the product variation is available at the same retail store, another retail store of the same franchise, or at any other remote pick-up post. In other embodiments, the customer can reserve the product variation for pick-up and make a payment using any one of the payment methods described below.

In other embodiments, such details for later pick-up can be pre-stored on the mobile application such that the customer does not have to input the information again for every transaction. In some embodiments, the user has the option to choose whether to save pick-up information for later use on the mobile application or not.

Alternatively, the customer may decide to select the delivery option. If a customer selects the delivery option, then in some embodiments, the mobile application displays a delivery time and location input field where the customer can input when and where the customer wants the selected products to be delivered. In some embodiments, this can include input fields for delivery address, delivery time, person to deliver to, special packaging options, and special delivery instructions, among others.

In some embodiments, such delivery information can be pre-stored on the mobile application such that the customer does not have to input the information again for every transaction. In some embodiments, the user has the option to choose whether to save delivery information for later uses on the mobile application or not.

In other embodiments, the mobile application or store computing system can determine the earliest possible delivery time based on a number of factors. In some embodiments, such factors can include availability of the item at other retail stores of the same franchise, availability of the item at other non-franchise retail stores, availability of the item on the manufacturer's end, time required to transport and receive the item at each location, weather forecast, distance to delivery location from location of the item, among others.

In some embodiments, regardless of whether the later pick-up or delivery option is chosen, the mobile application displays to the customer payment options. In certain embodiments, the customer can decide to pay at a check-out counter or to pay using the mobile application or device at block 906. In certain embodiments, if a customer decides to make a payment on the mobile device or application, then the mobile application facilitates a payment transaction for the user at block 914.

In some embodiments, a customer can directly enter or otherwise input financial information into the fields displayed on the mobile application. In other embodiments, some of the required financial information can be pre-stored on the mobile application such that the customer does not have to input the information again for every transaction. In certain embodiments, the user has the option to choose whether to save financial information on the mobile application or not. In other embodiments, even if such financial information is saved on the mobile application, the customer can opt to use such stored information on demand only. In some embodiments, such financial information can include credit card type, credit card numbers, credit card expiration dates, credit card security codes, billing address, billing phone number, checking account routing number, checking account number, savings account routing number, savings account number, among others.

Alternatively, a customer can decide not to make a payment on the mobile device but to pay in-person at a check-out counter. A customer may wish to pay for the product at a check-out counter because the customer does not wish to save or type in financial information on the mobile device. Alternatively, the customer may wish to pay for the product at a check-our counter because the customer wishes to make a single payment for multiple items. Or, in some cases, the customer may wish to pay at a check-out counter because the customer wishes to pay for the product to be delivered together with another product the customer physically picked up at the same retail store. If so, then in some embodiments, the mobile application or device 500 generates and displays a unique transaction identification code 920 at block 908. The unique transaction identification code 920 can include a QR code 930, barcode, number, or text to identify the selected product(s) and price(s).

Then, in certain embodiments, a customer can scan or otherwise input the unique transaction identification code 920 displayed on the mobile device 500 into a terminal or input device of the store computing system at a check-out counter 214. Or in other embodiments, an employee at a check-out counter 214 will scan or otherwise input the unique transaction identification code 920. In some embodiments, upon inputting the payment page, the store computing system or check-out counter recognizes the item(s) the customer wishes to purchase and price(s). The customer can then purchase the item using any acceptable method of payment at block 912.

In some embodiments, a single transaction identification code 920 may be associated with more than one product. For example, if a customer selects multiple products via the mobile application for later pick-up or delivery, in some embodiments, the mobile application will generate a single transaction identification code 920 that can identify all purchased products instead of generating one transaction identification code per item. Then, in such embodiments, a customer can simply scan or otherwise input the single transaction identification code 920 at a check-out counter to identify all items.

Similarly, in certain embodiments, the mobile application generates and displays a single code associated with all items the customer wishes to purchase, regardless of whether a subset of those items are available at the customer shopping area, are available at the non-customer storage area, or are not available at the store but are only available for delivery or later pick-up.

Regardless of whether a customer made a payment for a product through a mobile device or in-person at a check-out counter, in some embodiments then displays a unique order confirmation code 922 at block 916. The order confirmation code can be a QR code 932, barcode, number, or text to identify the purchased product and the customer. In some embodiments where the customer made a payment in-person, the order confirmation code 922 can be the same as or different from transaction identification code 920.

Then, in certain embodiments, a customer uses the order confirmation code 922 to identify the customer and the products purchased upon delivery or pick-up at block 918. In some embodiments where the delivery option was selected, a delivery personnel scans or otherwise inputs the order confirmation code 922 displayed on the customer's mobile device upon delivery to confirm that the identity of the customer and the products purchased. Similarly, in other embodiments where the pick-up later option was selected, a pick-up personnel or automated system scans or otherwise inputs the order confirmation code 922 displayed on the customer's mobile device when the customer goes to pick up the item to identify the customer and the purchased product.

In some embodiments, a single order confirmation code 922 is associated with more than one product. For example, if a customer orders multiple products via the mobile application for later pick-up or delivery, in some embodiments, the mobile application will generate a single order confirmation code 922 that can identify all purchased products instead of generating one order confirmation code per item. Then, in such embodiments, a customer can simply scan or otherwise input the single order confirmation code 922 upon delivery or pick-up to identify all purchased items.

Control System

In an embodiment, a control system or computer controller controls the whole method or parts thereof described herein. The terms "control system" and "controller" are used interchangeably herein. In some embodiments, the control system is located at the retail store. In other embodiments, the control system is located at a location separate from the retail store. In some embodiments, the control system is a dedicated system configured to perform the functions described below. In other embodiments, the control system comprises a general computer system and software or computer program configured to perform the functions described below.

The controller coordinates communication between the mobile device and the store computing system at various times throughout the process. For example, in some embodiments, once the mobile device or application determines that the user is sufficiently close to the retail store, the controller coordinates transmittal of general store information to the mobile device. Further, in some embodiments, the mobile device coordinates allowing the user to browse products for sale at a particular retail store and/or allowing the user to search for products for sale at a particular store.

When a user or customer scans a unique product identification code with the mobile device or application, the control system coordinates or facilitates electronic transmittal of the scanned data from the mobile device to the store computing system. The controller also coordinates or facilitates transmittal of the search results and related data from the store computing system back to the mobile device. In addition, the controller also facilitates generation and transmittal of unique transaction identification codes to the mobile device.

When a customer selects a product available in the customer shopping area, the controller also facilitates transmittal of information regarding the location of a certain product within the customer shopping area to the mobile device, which in some embodiments includes directions, map, or general location information.

When a customer selects or requests pick-up of a product available in the non-customer storage area, the controller facilitates or coordinates transmittal of the estimated time until pick-up is available. Also, the controller coordinates transfer of a pick-up request to the store computing system. The controller further facilitates generation and/or transmittal of a unique pick-up request confirmation code to the mobile device.

When a customer selects later pick-up or delivery of a product currently unavailable at the store, the controller facilitates or coordinates transmittal of the request for pick-up or delivery at a later time to the store computing system. When the customer selects to check-out via a mobile device, the control system coordinates communications between the mobile device and the store computing system for the check-out process, including transmittal of payment information and generation and transmittal of a unique order confirmation code. When the customer selects to check-out at a check-out counter, the controller facilitates generation and transmittal of a unique transaction identification code to the mobile device.

Duty-Free Store at an Airport

Airports often include duty-free stores, especially, in international terminals, where customers can purchase products without paying taxes. A duty-free store can provide unique product identification codes, such as QR codes, for the products displayed in the store. Similar to FIGS. 4 and 5, customers may initiate purchase transaction of products displayed in the duty-free store by scanning the unique product identification codes associated with the products with their mobile phones. Scanning the unique product identification codes may provide information that can be used to make a payment transaction for the displayed products. After a customer makes a payment transaction for the products the customer wants to purchase, the customer may receive information about picking up the purchased products.

An airport may provide a product storage area and a product pickup area, where purchased products can be retrieved and picked up, respectively. The product storage area and/or the pickup area may be attached to the duty-free store, or may be detached from the duty-free store. Copies of purchased products may be retrieved from the product storage area and delivered to the product pickup area. Customers can pick up the copies of the purchased products from the product pickup area prior to boarding their planes.

All features, embodiments, and techniques described in connection with FIGS. 1-9 may also apply in the context of a duty-free store at an airport with or without specific reference to such features, embodiments, or techniques. In one aspect, the duty-free context may differ from previously described embodiments in having a product storage area and a product pickup area that are not annexed to the duty-free store. For any common features, the techniques described with respect to FIGS. 1-9 can apply in the same or similar manner. In addition, the techniques described in FIG. 1-9 may also apply to any features that are different in the duty-free context from previously described embodiments.

Secure Zone and Non-Secure Zone at an Airport

Figure 10:
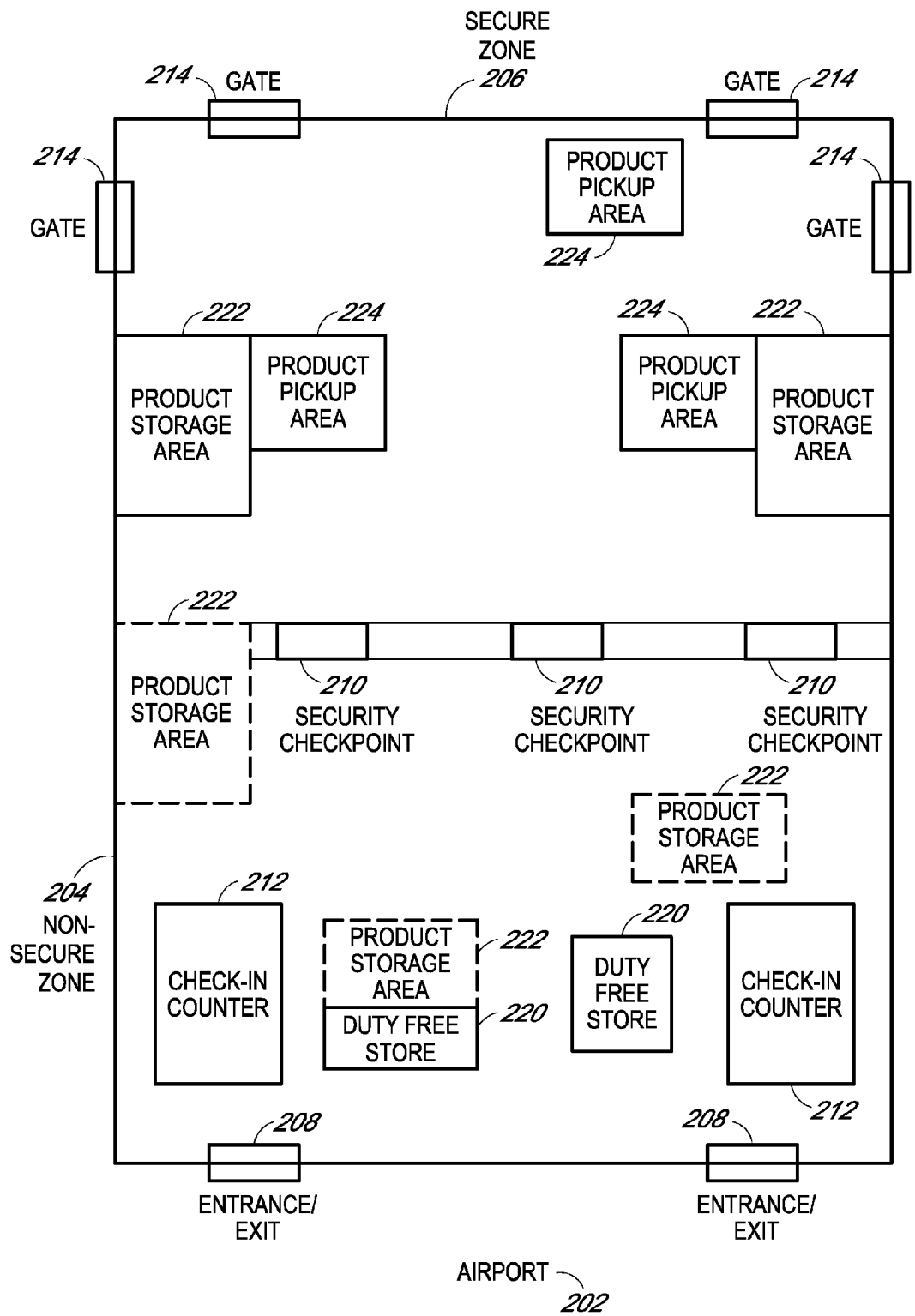
FIG. 10 depicts an airport with one or more duty-free stores, a product storage area, and one or more product pickup area, according to one embodiment of the invention.

FIG. 10 depicts an airport terminal building 200 with one or more duty-free stores 220, one or more product storage areas 222, and one or more product pickup area 224, according to one embodiment of the invention. As illustrated in FIG. 10, an airport terminal building or airport 200 may include a secure zone 206 and a non-secure zone 204. A "secure zone" refers to an area a passenger may enter after passing through a security checkpoint 210. A "non-secure zone" refers to an area a passenger may enter or is accessible to a passenger before passing through a security checkpoint 210. The secure zone 206 and the non-secure zone 204 is separated by at least one security checkpoint 210.

A "security checkpoint" refers to a location in the airport 200 where a passenger's identification is verified and the passenger is checked for possession of any forbidden items. For example, a passenger shows his or her ID card and boarding pass, and passes through an X-ray scanner. If the passenger clears the security check 210, the passenger is permitted to enter the secure zone 206 of the airport 200.

The airport 200 can include one or more entrances and/or exits 208 that allow passengers to enter or exit the airport 200. Passengers can enter the non-secure zone 204 of the airport 200 or exit from the non-secure zone 204 of the airport 200 through the one or more entrances and/or exits 208. The airport 200 may also include one or more check-in counters 212 in the non-secure zone 204, where passenger can check in for their flights. The airport 20 can also include one or more gates 214, where passengers can board planes.

Duty-Free Store

The airport 200 may include one or more duty-free stores 220 in the non-secure zone 204 of the airport 200. A duty-free store 220 may sell products without paying local or national taxes or duties. When a duty-free store 220 is located in the non-secure zone 204, a passenger can purchase products in the duty-free store 220 prior to passing through a security checkpoint 210. The duty-free store 220 displays products for sale and unique product identification codes in connection with the displayed products. A passenger who purchases products from the duty-free stores 220 may be referred to as a "customer." In some embodiments, the duty-free stores 220 may be located in the secure zone 206. In such embodiments, a passenger may purchase products in the duty-free store 220 after passing through a security checkpoint 210.

Product Storage Area

The airport 200 may also include one or more product storage areas 222. A product storage area 222 can store copies of the products that are displayed in the duty-free stores 220. In some embodiments, a product storage area 222 may be remote from the duty-free stores 220. For example, a product storage area 222 can be detached and physically separate from the duty-free stores 220. In other embodiments, a product storage area 222 may be attached to, adjacent to, or annexed to the duty-free store 220. The product storage area 222 can be located in the secure zone 206, the non-secure zone 204, or outside the airport terminal building 200. However, the product storage area 222 may not be accessible to passengers. In one embodiment, the product storage area 222 is accessible from the secure zone 206 without passing through the security checkpoint 210. For example, all or most of the product storage area 222 may be located in the non-secure zone 204, but access to the product storage area 222 is provided from the secure zone 206 so that an employee of the duty-free store or related personnel can enter the product pickup area 222 without going to the non-secure zone 204.

A product purchased by a customer at a duty-free store 220 may be provided to the customer by retrieving a copy of the product from the product storage area 222. The term "copy" of a product may be used to refer to the actual item that is delivered to the customer in the product pickup area 224. For example, the customer may examine and purchase a camera displayed in the store 220 by scanning the unique product identification code for the camera. The camera delivered to the customer in the product pickup area 224 may not be the same camera the customer saw in the duty-free store 220, but another one of the same product available from the product storage area 222.

In some embodiments, the product storage area 222 can store copies of variations of the products displayed in the duty-free stores 220. The variations themselves may not be displayed in the duty-free stores 220. In this way, the duty-free stores 220 may offer more products for sale than can be displayed in the physical space of the store 220.

The product storage area 222 may be operated by an entity that is different from the entity that operates the duty-free store 220. For example, the product storage area 222 may be operated by the airport under an agreement between the duty-free store 220 owner and the airport.

Product Pickup Area

The airport 200 may provide one or more product pickup areas 224 in the secure zone 206. The copy of the product retrieved from the product storage area 222 may be delivered to the product pickup area 224 so that the customer can obtain the copy of the product. A product pickup area 224 may be a predetermined area, such as an assigned physical space. For example, the product pickup area 224 may be a booth where customers can pick up the copies of the purchased products. The product pickup area 224 can be annexed to the product storage area 222, which can facilitate retrieval and delivery of products. In other embodiments, the product pickup area 224 may be adjacent or next to the gate 214 of a passenger's flight. In such embodiments, the product pickup area 224 may not be a predetermined area and may not have a specifically assigned physical space.

In some embodiments, the product pickup area 224 may be located in the non-secure zone 204. The product pickup area 224 may be remote from the duty-free store 220, or may be annexed to the duty-free store 220, depending on the embodiment. The customer can pick up the purchased products or copies of the purchased products prior to passing a security checkpoint 210. For example, the customer can pick up the actual item purchased or a copy of the product purchased within the duty-free store 220 if the product pickup area 224 is located within the duty-free store 220.

In certain embodiments, the duty-free stores 220 may be located in the secure zone 206. The product storage area 222 and/or the product pickup area 224 may still be remote from the duty-free store 220, or may be annexed to the duty-free store 220, depending on the embodiment.

Overview of Operating a Duty-Free Store at an Airport

Figure 11:
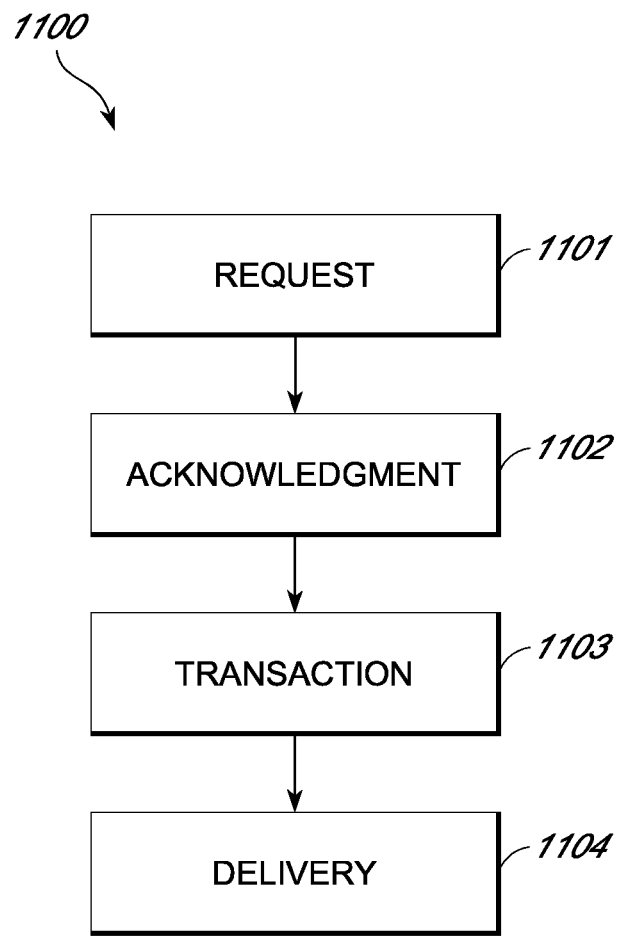
FIG. 11 is a flowchart of operating a duty-free store at an airport according to one embodiment of the invention.

FIG. 11 illustrates a flowchart of a process 1100 for operating a duty-free store 220 at an airport terminal building 200 according to one embodiment of the invention.

At block 1101, when a customer wishes to purchase a product displayed in the duty-free store 220, the customer sends a request for initiating purchase transaction for the product using a mobile computing device. For example, the customer may scan the unique product identification codes for the products displayed in the store 220, and the mobile computing device can generate and wirelessly send a request. The request may be received by a wireless terminal of the computing system associated with the duty-free store 220. The wireless terminal may be located within the duty-free store 220 or another location within the non-secure zone 204.

At block 1102, the customer receives an acknowledgment for the request from the duty-free store 220. In response to receiving the request, the computing system associated with the duty-free store 220 may send an ack for the request to the customer's mobile computing device. The ack may include information that can be used to process a purchase transaction of the product using the mobile computing device. Such information can include a QR code for the product, a QR code for the transaction, etc. The ack may be received within the duty-free store 220 or another location within the non-secure zone 204.

At block 1103, a transaction for the purchase of the product is performed. The customer can purchase the product using the mobile computing device, for example, based on the information provided in the acknowledgment. The customer receives pickup information for the product after the transaction is complete. The transaction may be performed within the duty-free store 220 or another location within the non-secure zone 204.

At block 1104, the product is delivered to the customer. The customer may pick up the purchased product at a designated product pickup area 224. Delivery and/or pickup may occur within the secure zone 206, for example, at the product pickup area 224. The customer can pick up the product only after passing through a security checkpoint 210.

In some embodiments, all of the blocks in FIG. 11 can occur within the secure zone 204. For example, the duty-free store 220 can be located in the secure zone 204, instead of the non-secure zone 206. Certain aspects of FIG. 11 may be explained in more detail in connection with FIGS. 12A and 12B.

Operating a Duty-Free Store at an Airport

Figure 12A:
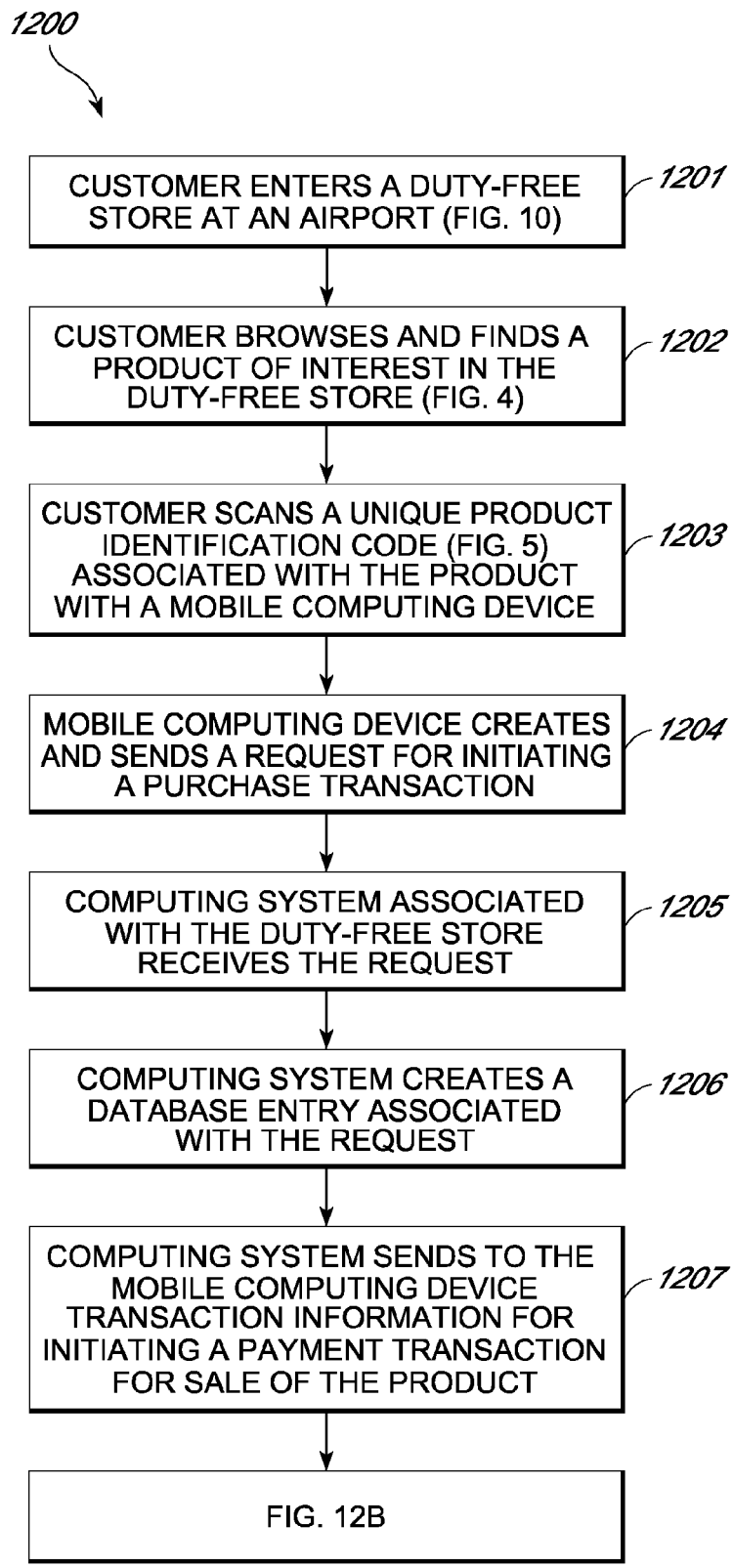
FIGS. 12A and B illustrate a flowchart of operating a duty-free store at an airport according to another embodiment of the invention.
Figure 12B:
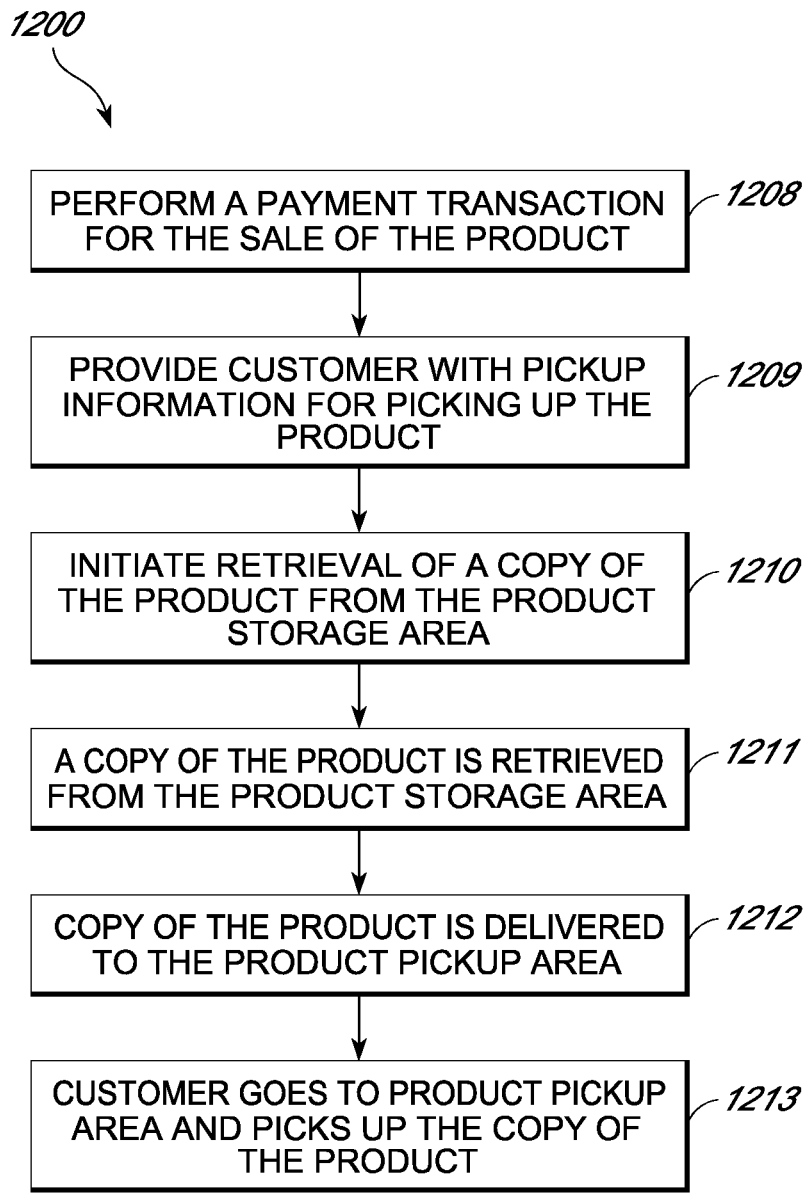

FIGS. 12A and 12B illustrate a flowchart of operating a duty-free store 220 at an airport 200 according to one embodiment of the invention. The process 1200 is explained mainly in the context of purchasing one product, but a customer may purchase multiple products at one time. Details relating to purchasing multiple products are provided later in the description.

At block 1201, the customer enters a duty-free store 220 at an airport 200. As shown in FIG. 10, the airport 200 can include a secure zone 206 and a non-secure zone 204, which are separated by at least a security checkpoint 210 from the point of view of passengers. The duty-free store 220 may be located in the secure zone 206. A passenger may be referred to as a "customer" in the context of shopping at the duty-free store 220.

At block 1202, the customer browses and finds a product of interest in the duty-free store 220. The duty-free store 220 displays one or more products, copies of which are stored in the product storage area 222. In some embodiments, the product storage area 222 stores copies of variations of the product, as explained in further detail below. The variations of the product may not be displayed in the store, but copies of the variations can be available from the product storage area 222.

The customer may browse and find products, for example, as shown in FIG. 4. The duty-free store 220 displays unique product identification codes (or simply "unique identification codes") associated with the displayed products. In one embodiment, the unique product identification codes are QR codes. In other embodiments, the unique product identification codes are barcodes, texts, number codes, etc. The unique product identification codes can be captured or scanned by the customer's mobile computing device using its camera feature. In some embodiments, scanning is done with a special application for scanning the unique product identification codes. A mobile computing device may be a mobile device, such as a mobile phone. Mobile devices are explained in more detail above.

Request

At block 1203, the customer scans a unique product identification code associated with the product with a mobile computing device. When the customer finds a product the customer wants to purchase, the customer may use the mobile computing device to capture the unique product identification code associated with the product. For example, the customer may take a photo of a product's unique product identification code. In some embodiments, the customer may capture the unique product identification codes for multiple products in sequence, as explained in detail below.

At block 1204, the mobile computing device creates and sends a request for initiating a purchase transaction. The mobile computing device can create a request for initiating a purchase transaction in relation to the capturing of the unique product identification code of the product, and send the request to a computing system associated with the duty-free store 220. In one embodiment, scanning the unique product identification code provides instructions and/or information to the mobile computing device for communicating with the computing system. The scanned information can provide information regarding the computing system, establishing a connection to the computing system, generating a request, etc. For example, the scanned information may indicate the IP address of the computing system and the format the request should be in. The mobile computing device can initiate communication with the computing system and generate a request based on the scanned information or instructions. For instance, the mobile computing device can establish a connection to the computing system using the IP address of the computing system, generate a request in the format preferred by the computing system, and send the request to the computing system. In some embodiments, scanning the unique product identification code automatically starts an applet, mobile application, or a mobile webpage for initiating a purchase transaction.

In some embodiments, the mobile computing device may create and send the request without displaying any information on the mobile computing device before sending the request. In other embodiments, the mobile computing device may display a user interface, such as a web page or an applet page, where the customer can view the product information and/or enter or confirm the number of copies of the product the customer wants to purchase.

The request can include product information indicative of the product. The request may also include the number of copies the customer wants to purchase for the product. The request can include any information that may be used in purchasing a product. In embodiments where the customer captures the unique product identification codes for multiple products, the request can include product information indicative of each product associated with the captured unique product identification codes. The request may also include the number of copies the customer wants to purchase for each product. The request can include an identifier for the mobile computing device.

Receiving the Request

At block 1205, the computing system associated with the duty-free store 220 receives the request. In some embodiments, the computing system may be shared by the duty-free stores 220 in the airport 200. For example, the airport 200 may provide a computing system that the duty-free stores 220 can utilize under an agreement with the airport 200.

Creating a Database Entry Associated with the Request

At block 1206, the computing system creates a database entry associated with the request. In response to receiving the request, the computing system creates a database entry for the request. The database entry can include the product information received in the request. The database entry can also include the number of copies of the product received in the request. The database entry may also include mobile device information related to the mobile computing device of the customer. The database entry can include any other information that is used in processing the request. In embodiments where multiple products are purchased, the database entry can include the product information and/or the number of copies of the product for each of the multiple products.

Acknowledgment (Ack) and Transaction

At block 1207, in response to receiving the request, the computing system sends transaction information for initiating a payment transaction for sale of the product to the mobile computing device. Transaction information is associated with the database entry that was created for the request received from the mobile computing device. Transaction information can include a unique identifier associated with and identifying the database entry and/or the request that was sent from the customer's mobile computing device. The unique identifier can be used to identify or obtain information in the database entry that may be used in initiating and/or performing a payment transaction. The unique identifier may be the same as or different from the unique product identification code associated with the product.

The unique identifier may be a QR code, a bar code, or any code that is capable of identifying the database entry. The unique identifier may be input at a point of sale location of the duty-free store 220, in order to initiate a payment transaction for sale of the product at the point of sale location. In embodiments where the unique identifier is a QR code, the QR code can be scanned at the point of sale location, and the scanning can trigger and initiate a payment transaction for the sale of the product. For example, an optical reader reads the QR code, and in response, the computing system accesses the associated database entry to obtain information to process the payment transaction. As explained above, such information can include the product information, number of copies of the product, the identifier for the mobile computing device, etc. Various methods can be used to perform the transaction. Some examples of such methods are described in more detail below.

Payment Transaction

At block 1208, a payment transaction for the sale of the product is performed (e.g., by the computing system). The payment transaction may be performed using the transaction information and referring to the database entry for the request. The customer can use the transaction information to make a payment for the product using the mobile computing device. The transaction information may include a unique identifier associated with the database entry for the request, and the database entry can be accessed to look up information for the transaction such as product information, number of copies of the product, the identifier for the mobile computing device, etc. When the customer initiates a payment transaction for a sale of the product using the transaction information, the computing system performs a payment transaction.

Pickup Information

At block 1209, pickup information for picking up the product is provided to the customer (e.g., by the computing system) after the payment transaction for the sale of the product is performed. When the payment transaction is complete, the computing system can provide pickup information for the product. As explained above, a copy of a product purchased in the duty-free store 220 is retrieved from the product storage area 222 and delivered to the product pickup area 224 for pickup. The pickup information includes the location of the product pickup area 224. The pickup information may also include an estimated time for the pickup of the product. The pickup information can include tracking information that provides status information about the retrieval and/or delivery of the copies of the purchased products. Tracking information is explained in more detail below.

In some embodiments, the product pickup area 224 may be a location that is predefined prior to the payment transaction. In other embodiments, the product pickup area 224 may be an area adjacent to the gate that the customer indicates during the payment transaction. In embodiments where the customer purchases multiple products, the pickup information can include information for picking up copies of the multiple products.

Delivery

At block 1210, retrieval of a copy of the product from the product storage area 222 is initiated (e.g., by the computing system). For example, the computing system may send a retrieval request to the product storage area 222. Retrieval may use techniques described in connection with FIG. 8. An employee of the duty-free store 220 or airport personnel may process the retrieval request and obtain a copy of the product from the product storage area 222.

At block 1211, a copy of the product is retrieved from the product storage area 222. An employee of the duty-free store 220 or airport personnel can retrieve a copy of the product, for example, based on the information in the retrieval request. Such information can include the unique product identification code, number of copies, color, size, etc.

At block 1212, the copy of the product is delivered to the product pickup area 224. After the copy of the product is retrieved, the copy of the product is delivered to the product pickup area 224 so that the customer can obtain the copy before boarding the plane. The product pickup area 224 may be annexed to the product storage area 222 such that the retrieval and delivery process can be more efficient and streamlined.

At block 1213, the customer goes to the product pickup area 224 and picks up the copy of the product. The customer can check the status of retrieval and/or delivery of the copy and go to the designated product pickup area 224 at or after the estimated delivery time. In some embodiments, the computing system may provide an identification code for pickup, and the customer can input the identification code in order to obtain the copy of the product. Such identification code may be provided to the customer as a part of the pickup information.

In some embodiments, tracking information regarding the status of retrieval and/or delivery of the copy of the product is provided to the customer, e.g., to the customer's mobile computing device. Tracking information is explained in more detail below.

Various Methods of Transaction

In connection with Blocks 1207 and 1208 in FIG. 12A, various methods can be used for the purchase transaction of the product. In one embodiment, sending the transaction information to the mobile computing device may display a web page where the customer can perform the transaction. For example, the web page can display one or more products to be purchased along with related information such as number of copies, color, size, etc. In another embodiment, sending the transaction information to the mobile computing device installs an applet or a mobile application that can be used to perform the transaction. The applet or the mobile application can provide an electronic payment transaction interface, which the customer can use to make a payment for the purchase. In other embodiments, the transaction information may include a unique identifier for the transaction, such as a QR code. As explained above, inputting the unique identifier, e.g., at a point of sale location in the duty-free store 220, can initiate a payment transaction for the product.

The purchase transaction may occur using a mobile phone network. For example, a mobile computing device may perform the transaction via a mobile phone network associated with the mobile computing device. In some embodiments, the mobile computing device may not have a mobile phone network associated with it, and may use a wireless network, such as Wi-Fi, to make the purchase.

Scanning in Multiple Unique Product Identification Codes in Sequence

In some cases, the customer may capture the unique product identification codes for more than one product. The mobile computing device may generate one request for all the products, or may generate a separate request for each product, depending on the embodiment. For example, the mobile computing device may queue the scanned unique product identification codes and generate a request after a certain period of time passes.

In a specific, illustrative example, the customer captures the unique product identification codes for two products using the mobile computing device. For purposes of discussion, a product that is scanned first will be referred to as the "first product," and a product that is scanned second will be referred to as the "second product." The unique product identification code for the first product will be referred to as the "first unique identification code," and the unique product identification code for the second product will be referred to as the "second unique identification code."

In some embodiments, the request for initiating a purchase transaction is created further in relation to the customer's capturing of the second unique identification code using the mobile computing device. For example, the request may be created in response to both the capturing of the first unique identification code and the capturing of the second unique identification code, and may be created using the captured first and second unique identification codes. The request may also include product information for the second product, and may also include the number of copies for the second product. In these embodiments, one request can be created for more than one captured unique product identification code, and the request can include production information, number of copies, and/or any other information for more than one product.

After receiving the request, the computing system may create a database entry associated with the request. The computing system may add the information associated with the first and second products in the request to the database entry (e.g., product information, number of copies of the product, any other related information for both the first and second products).

In other embodiments, one request may be created in response to capturing the first unique identification code, and another request may be created in response to capturing the second unique identification code. The request associated with the first product may be referred to as the "first request," and the request associated with the second product may be referred to as the "second request." The first request can include product information for the first product, number of copies of the first product, and/or any other information. The second request can include product information for the second product, number of copies for the second product, and/or any other information. The first request can be sent soon after the first unique identification code is scanned, and the second request can be sent soon after the second unique identification code is scanned.

After receiving the first request, the computing system can create a database entry for the first request. The database entry may include the product information for the first product, the number of copies for the first product, and/or any other information relating to the first product. After receiving the second request, the computing system can create another database entry for the second request. The additional database entry may include the product information for the second product, the number of copies for the second product, and/or any other information relating to the second product.

In some embodiments, the computing system may add the information in the second request to the database entry for the first request, instead of creating another database entry for the second request. In such embodiments, the database entry for the first product can include the product information for both first and second products, the number of copies for both the first and second products, and any other information relating to both the first and second products.

In cases the customer scans multiple product identification codes, transaction information used in purchasing a product may be sent together for the multiple products, or may be sent separately for each product, depending on the embodiment. With reference to the specific example for two products, transaction information for purchasing the first product and the second product may be sent together. Or transaction information for purchasing the first product and transaction information for purchasing the second product may be sent separately. For example, if the request for initiating a purchase transaction is received separately for the first and second products, the computing system may send the transaction information for initiating a payment transaction separately for the first and second products.

In some embodiments, the transaction information for multiple products is sent separately for each product, but the transaction information that is sent later can be appended to the transaction information that was sent previously. For example, the transaction information for multiple products may be displayed together on the mobile computing device even though the information for each product is sent separately.

The transaction information may include a unique identifier associated with one or more database entries. One unique identifier may be related to information about one product, or may be related to information about multiple products, depending on the embodiment. In some embodiments, a unique identifier is associated with one database entry. A database entry may include information about one product, or may include information about multiple products. In other embodiments, a unique identifier is associated with multiple database entries.

If the unique identifier represents more than one product, inputting the unique identifier at a point of sale location can initiate a payment transaction for all the products identified by that unique identifier. In some embodiments, a unique identifier may be related to one product, and for a transaction including multiple products, a new unique identifier can be created.

Variations of Products Displayed in the Duty-Free Store

In some embodiments, the product storage area 222 may store copies of variations of the products. A product may have one or more variations (e.g., available in different colors, sizes, etc.). For example, a camera in silver is displayed for sale in the duty-free store 220, but the same camera is available in black and white. The product storage area 222 may store one or more copies of the camera in black and white, in addition to silver. The product storage area 222 may store copies of the variations of a product even if the variations are not displayed in the duty-free store 220. In this manner, the duty-free store 220 can sell more products than can be physically displayed in the store.

If variations of a product are available, information about the variations of the product may be provided to the mobile computing device when the customer scans the unique product identification code for the product. For example, if the unique product identification code for the silver camera is scanned, the mobile computing device may display that the camera is also available in black and white. The customer can select one or more variations for purchase, instead of the displayed product. The customer may also select the number of copies for the variations. If the customer does not select one or more variations, the displayed product may be selected as the default.

Information about variations provided to the mobile computing device may include only the variations that are available in the product storage area 222. Since passenger customers generally want to pick up the products before they board the planes, whether a product and its variations can be delivered prior to boarding may be important. For example, the information about variations can be provided based on inventory information for the product storage area 222.

In some embodiments, scanning the unique product identification code of a product may also provide information about related products. Related products may not be variations of the same product, but products customers may be interested in view of the selected product. For example, if the customer scans the unique product identification code for a baseball, the related products may include a baseball bat, a baseball glove, etc. In some embodiments, related products may include the same type of product from other brands.

Displaying Single or Multiple Copies of Products in Duty-Free Store

Generally, retail stores display multiple copies of the same product for purchase. For example, a store may have on display multiple cameras of the same model so that multiple customers can each purchase a camera. Once the displayed cameras are all sold, the store may retrieve more cameras to display for sale.

In a duty-free store according to one embodiment, only a single copy of a product may be displayed in the duty-free store 220. Since the copy of the product can be picked up in the product pickup area 224, the duty-free store 220 itself does not have to make a product immediately available to the customer within the duty-free store 220. The customer can purchase a product by scanning a unique product identification code associated with it.

In other embodiments, the duty-free store 220 may display multiple copies of the same product. For example, if the purchased products can be picked up in or near the duty-free store 220, the copies of various products can be available for pickup and can be easily provided to the customers.

Verifying Passenger Identification and/or Flight Information

In connection with Block 1213 in FIG. 12B, the customer's identity may be verified at the time of pickup. In some embodiments, the customer's identity may be verified at the product pickup area 224 by checking the customer's ID and boarding pass. In other embodiments, the customer's identity and boarding information are verified at the time of payment transaction such that products may be sold only to passenger customers, and not to persons who are not passengers.

Providing Tracking/Status Information

In connection with Blocks 1209 through 1213 in FIG. 12B, in certain embodiments, tracking information for the product is provided to the customer. Tracking information can provide status information with respect to the delivery of the copy of the product after purchase of the product. The customer can refer to the tracking information to determine when to go to the product pickup area 224 for the pickup. Some examples of status information include: information that retrieval of a copy of the product has been initiated from the product storage area 222; information that a copy of the first product has been retrieved within the product storage area 222; and information that a copy of the first product is available at the product pickup area 224. The tracking information can include any information relating to retrieval and/or delivery of the product that may be helpful to the customer.

Providing In-Store Wireless Connection and/or Mobile Devices

In many cases, passengers purchasing products from the duty-free stores 220 may not reside in the country where the airport 200 is located. For example, the passengers may be traveling from a foreign country and returning to their home country. Accordingly, many passenger customers may not have a mobile phone plan that they can use to make purchases from their mobile computing device.

In certain embodiments, the duty-free stores 220 may provide wireless network connection (e.g., Wi-Fi) that the customers can use in order to make purchases from the stores 220. Each duty-free store 220 may provide wireless connection for an area near the store 220. Or the airport 200 may provide wireless network connection that the duty-free stores 220 can use.

In certain embodiments, the customer can connect to the wireless network provided by the duty-free store 220 and begin making purchases without any special procedure. Scanning the unique product identification code can provide instructions to the mobile computing device regarding where to send requests (e.g., IP address of the computing system). In other embodiments, initial wireless connection may be established in order to obtain permission to use the wireless network to initiate a purchase transaction. For example, scanning a unique product identification code displays a portal web page, where the customer can agree to the terms for using the wireless connection provided by the duty-free store 220. After the customer accepts the terms of usage, any requests to the computing system of the duty-free store 220 can be forwarded to the computing system and processed.

In some embodiments, the duty-free stores 220 may also provide mobile computing devices that the customers can use to make purchases. For example, a customer can borrow a mobile computing device while the customer is inside the duty-free store 220, and scan a unique identification code and purchase the associated product. Use of mobile computing devices can make the purchase and/or transaction process faster and more efficient. For example, the customer may not have to stand in line in order to check out. The customer can simply perform the transaction on the mobile computing device, for example, through a web page or an applet page.

Purchasing Additional Items after Passing Through Security Checkpoint

In some cases, the customer may want to purchase one or more products from a duty-free store 220 after passing the security checkpoint 210. If the customer purchases products outside the duty-free store 220, the unique product identification codes associated with products may not be available to scan. The customer may purchase products using the mobile computing device, for example, through a mobile web page. If the customer already made a purchase at the duty-free store 220, the customer can purchase one or more additional products and add the products to an existing transaction. For example, customer may make the purchase for additional products using the mobile web page or at the product pickup area 224.

In certain embodiments, the mobile computing device of the customer may create an additional request and send an additional request for initiating a purchase transaction for additional products to the computing system associated with the duty-free store 220. In response to the additional request, the computing system may update the database associated with the previous request to reflect the additional product information, number of copies of additional products, etc. The computing system can send transaction information associated with the database entry for use in initiating a payment transaction for the sale of the additional products to the mobile computing device.

After the payment transaction for the sale of the additional products is performed, the customer may receive information for picking up the additional products. For example, the pickup information can include tracking information for the additional products, pickup location, estimated delivery time, etc. The unique identifier for the transaction may also be updated to reflect information about the additional products.

As explained above, the customer may purchase products outside a duty-free store 220 using a mobile web page. Or the customer may purchase products at a product pickup area 224. For instance, the customer may walk up to a product pickup area 224 that is annexed to a product storage area 222. The customer may make a payment transaction using the customer's mobile computing device, and a copy of the purchased product can be retrieved from the product storage area 222 and delivered to the product pickup area 224.

Although the embodiments of the inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combine with or substituted for one another in order to form varying modes of the disclosed inventions. Thus, it is intended that the scope of the present inventions herein disclosed should not be limited by the particular disclosed embodiments described above.

What is claimed is:

1. A method of running a duty-free retail operation at an airport, the airport comprising a secure zone and a non-secure zone, which are separated for passengers by a security checkpoint, the method comprising:
providing a duty-free store in the non-secure zone;
displaying products for sale in the duty-free store, the products for sale comprising a first product and a second product;
displaying unique product identification codes in connection with products displayed therein, the unique product identification codes comprising a first unique identification code associated with the first product and a second unique identification code associated with the second product;
providing a product pickup area;
providing a product storage area configured to store copies of the products displayed in the duty-free store, the product storage area being inaccessible to customers;
receiving, by a computing system associated with the duty-free store, a first request for initiating a purchase transaction, the first request being created and sent from a mobile computing device of a first customer in relation to the first customer's capturing of the first unique identification code using the mobile computing device, the first request comprising first product information indicative of the first product;
in response to the first request, creating a first database entry associated with the first request, the first database entry comprising the first product information;
in response to the first request, sending to the mobile computing device transaction information associated with the first database entry for use in initiating a payment transaction for a sale of the first product;
performing a payment transaction for the sale of the first product using the transaction information and referring to the first database entry;
upon completion of the payment transaction, providing the first customer with pickup information for picking up a copy of the first product within the secure zone;
subsequent to completion of the payment transaction, initiating retrieval of a copy of the first product from the product storage area for delivery of the copy to the product pickup area; and
delivering the copy of the first product to the first customer at the product pickup area.

2. The method of claim 1, wherein the transaction information comprises a unique identifier associated with the first database entry, wherein the unique identifier is either the same as or different from the first unique identification code.

3. The method of claim 2, further comprising: adding mobile device information indicative of the mobile computing device of the first customer to the first database entry so that the unique identifier is to identify the mobile computing device of the first customer.

4. The method of claim 2, wherein the first request comprises a number of copies of the first product that the first customer desires to purchase, wherein the method further comprises adding number information indicative of the number of copies of the first product to the first database entry so that the unique identifier is to further identify the number of copies of the first product.

5. The method of claim 2, further comprising inputting the unique identifier at a point of sale location of the duty-free store, which initiates a payment transaction of the first product at the point of sale location.

6. The method of claim 2, wherein the unique identifier comprises a QR code, wherein the method further comprises scanning the QR code at a point of sale location of the duty-free store, wherein scanning of the QR code initiates a payment transaction of the first product at the point of sale location.

7. The method of claim 1, wherein the first request for initiating a purchase transaction is created further in relation to the first customer's capturing of the second unique identification code using the mobile computing device, the first request further comprising second product information indicative of the second product.

8. The method of claim 7, wherein the first request for initiating a purchase transaction is created using the captured first and second unique identification codes and further based on the first customer's confirmation of a desired number of copies of each of the first and second products.

9. The method of claim 1, further comprising:
receiving, by the computing system, a second request for initiating a purchase transaction, the second request being created and sent from the mobile computing device of the first customer in relation to the first customer's capturing of the second unique identification code using the mobile computing device, the second request comprising second product information indicative of the second product; and
in response to the second request, creating a second database entry associated with the second request, the second database entry comprising the second product information; and
in response to the second request, further sending to the mobile computing device transaction information for use in initiating a payment transaction for a sale of the second product.

10. The method of claim 1, further comprising:
receiving, by the computing system, a second request for initiating a purchase transaction, the second request being created and sent from the mobile computing device of the first customer in relation to the first customer's capturing of the second unique identification code using the mobile computing device, the second request comprising second product information indicative of the second product; and
in response to the second request, adding the second product information to the first database entry.

11. The method of claim 1, wherein the transaction information comprises a web page for electronic payment transaction, wherein performing the payment transaction is conducted on the mobile computing device using the web page.

12. The method of claim 1, wherein sending the transaction information comprises installing an applet on the mobile computing device, wherein the applet comprises an electronic payment transaction interface, wherein performing the payment transaction is conducted on the mobile computing device using the applet.

13. The method of claim 1, wherein the first unique identification code comprises a QR code, wherein the customer's capturing of the first unique identification code comprises scanning the QR code using the mobile computing device of the customer.

14. The method of claim 1, wherein the pickup information comprises a location of the product pickup area.

15. The method of claim 1, wherein the pickup information comprises an estimated time for pickup at the product pickup area.

16. The method of claim 1, further comprising providing the customer with at least one selected from the group consisting of:
information that retrieval of a copy of the first product has been initiated from the product storage area;
information that a copy of the first product has been retrieved within the product storage area; and
information that a copy of the first product is available at the product pickup area.

17. The method of claim 1, wherein a retrieval request is forwarded to an employee of the duty-free store or an automated product retrieval system for retrieving the copy of the product from the product storage area.

18. The method of claim 1, wherein the product pickup area is a location that is predefined prior to the payment transaction.

19. The method of claim 1, wherein the product pickup area is an area adjacent to a gate that the customer provides during the payment transaction.

20. The method of claim 19, further comprising verifying customer identification and flight information by checking a boarding pass of the customer.

21. The method of claim 1, wherein the product storage area is within the secure zone or accessible to the secure zone without passing the security checkpoint.

22. The method of claim 1, wherein the product pickup area is annexed to the product storage area.

23. The method of claim 1, wherein the product storage area stores copies of variations of the first product, and wherein the first customer's capturing of the first unique identification code provides first product variation information indicative of the variations of the first product, the first request comprising the first product variation information.

24. The method of claim 1, wherein the product storage area is remote from the duty-free store.

25. The method of claim 1, wherein the product storage area is annexed to or accessible from the duty-free store.

26. The method of claim 1, wherein the product pickup area is remote from the duty-free store.

27. The method of claim 1, wherein the product pickup area is annexed to or accessible from the duty-free store.

28. The method of claim 1, wherein a single copy of a product is displayed in the duty-free store.

29. The method of claim 1, wherein multiple copies of a product are displayed in the duty-free store.

30. The method of claim 1, further comprising:
subsequent to performing the payment transaction for the sale of the first product, receiving, by the computing system associated with the duty-free store, a second request for initiating a purchase transaction, the second request being created and sent from the mobile computing device of the first customer, the second request comprising second product information indicative of a second product; and
in response to the second request, updating the first database entry associated with the first request, the first database entry comprising the first product information.

* * * * *

UNITED STATES PATENT AND TRADEMARK OFFICE
CERTIFICATE OF CORRECTION

PATENT NO. : 8,818,873 B1
APPLICATION NO. : 13/775043
DATED : August 26, 2014
INVENTOR(S) : Jong Myoung Kim et al.

Page 1 of 1

It is certified that error appears in the above-identified patent and that said Letters Patent is hereby corrected as shown below:

In the Specification

At Column 3, Line 15, Change "foreging" to --foregoing--.

At Column 3, Line 59, Change "foreging" to --foregoing--.

At Column 11, Line 40, Change "B" to --12B--.

At Column 11, Line 65, Change "space-saving," to --space-saving--.

Signed and Sealed this
Fourteenth Day of April, 2015

Michelle K. Lee
*Director of the United States Patent and Trademark Office*